US012763878B2

(12) United States Patent
Lee et al.

(10) Patent No.: US 12,763,878 B2
(45) Date of Patent: Oct. 13, 2026

(54) METHOD AND APPARATUS FOR ENCODING AND DECODING USING CRC BIT IN WIRELESS COMMUNICATION SYSTEM

(71) Applicant: SAMSUNG ELECTRONICS CO., LTD., Suwon-si (KR)

(72) Inventors: Donghun Lee, Suwon-si (KR); Seho Myung, Suwon-si (KR); Kwonjong Lee, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 18/532,992

(22) Filed: Dec. 7, 2023

(65) Prior Publication Data

US 2024/0204914 A1 Jun. 20, 2024

(30) Foreign Application Priority Data

Dec. 9, 2022 (KR) ........................ 10-2022-0171842

(51) Int. Cl.
*H04L 1/00* (2006.01)

(52) U.S. Cl.
CPC .......... *H04L 1/0061* (2013.01); *H04L 1/0041* (2013.01); *H04L 1/0057* (2013.01); *H04L 1/0071* (2013.01)

(58) Field of Classification Search
CPC ... H04L 1/0041; H04L 1/0057; H04L 1/0059; H04L 1/0061; H04L 1/0071
See application file for complete search history.

(56) References Cited

U.S. PATENT DOCUMENTS 6,701,483 B1 3/2004 Heegard et al.
10,153,787 B2 12/2018 El-Khamy et al.
(Continued)

FOREIGN PATENT DOCUMENTS

CN 109412748 A 3/2019
EP 1628405 B1 4/2013
(Continued)

OTHER PUBLICATIONS

International Search Report and Written Opinion of the International Searching Authority dated Feb. 27, 2024, in connection with International Application No. PCT/KR2023/095071, 8 pages.
(Continued)

*Primary Examiner* — Kent Krueger

(57) ABSTRACT

The present disclosure relates to a 5G communication system or a 6G communication system for supporting higher data rates beyond a 4G communication system such as long term evolution (LTE). A method performed by a transmitting node in a wireless communication system may include encoding a plurality of information bits using a plurality of cyclic redundancy check (CRC) bits, interleaving the plurality of the information bits and the plurality of the CRC bits using an interleaving pattern, generating a codeword by convolution-encoding and polar-encoding the plurality of the interleaved information bits and the plurality of the interleaved CRC bits, and transmitting the codeword to a receiving node. The interleaving pattern may correspond to a matrix generated based on a size of the plurality of the information bits and a size the plurality of the CRC bits.

16 Claims, 15 Drawing Sheets

(56) References Cited

U.S. PATENT DOCUMENTS

| | | | | |
|---|---|---|---|---|
| 10,270,470 | B2 | 4/2019 | Li et al. | |
| 10,686,473 | B2 | 6/2020 | Jeong et al. | |
| 10,693,503 | B2 | 6/2020 | Shin et al. | |
| 11,632,134 | B2 | 4/2023 | Sunwoo et al. | |
| 2007/0061673 | A1 | 3/2007 | Pan et al. | |
| 2020/0067525 | A1 | 2/2020 | Jayasinghe et al. | |
| 2020/0119844 | A1* | 4/2020 | Abotabl | H03M 13/2906 |
| 2020/0244288 | A1* | 7/2020 | Noh | H03M 13/2792 |
| 2021/0297094 | A1 | 9/2021 | Hamelin | |
| 2022/0052709 | A1 | 2/2022 | Hui et al. | |
| 2022/0303051 | A1 | 9/2022 | Luo et al. | |
| 2022/0377703 | A1* | 11/2022 | Yao | H04W 72/20 |
| 2023/0275693 | A1* | 8/2023 | Bae | H04L 1/0052 |
| 2024/0080158 | A1* | 3/2024 | Yunusov | H04L 5/0094 |
| 2024/0243882 | A1* | 7/2024 | Visoz | H04W 72/541 |

FOREIGN PATENT DOCUMENTS

| | | | |
|---|---|---|---|
| KR | 10-2008-0033441 | A | 4/2008 |
| KR | 10-2014-0077492 | A | 6/2014 |
| KR | 10-2015-0122757 | A | 11/2015 |
| KR | 10-2018-0031555 | A | 3/2018 |
| KR | 10-2019-0051245 | A | 5/2019 |
| KR | 10-2022-0105388 | A | 7/2022 |

OTHER PUBLICATIONS

Supplementary European Search Report dated Feb. 6, 2026, in connection with European Patent Application No. 23901177.8, 14 pages.

Jie Chen et al., "Distributing CRC Bits to Aid Polar Decoding," 2017 IEEE Globecom Workshops (GC WKSHPS), IEEE, Dec. 4, 2017, 6 pages.

Dennis Hui et al., "Interleaved CRC for Polar Codes," 2018 IEEE 87th Vehicular Technology Conference (VTC Spring), IEEE, Jun. 3, 2018, 5 pages.

Mohammad Rowshan et al., "Polarization-Adjusted Convolutional (PAC) Codes: Sequential Decoding vs List Decoding," IEEE Transactions on Vehicular Technology, IEEE, USA, vol. 70, No. 2, Feb. 2021, 14 pages.

* cited by examiner

METHOD AND APPARATUS FOR ENCODING AND DECODING USING CRC BIT IN WIRELESS COMMUNICATION SYSTEM

CROSS-REFERENCE TO RELATED APPLICATION

This application is based on and claims priority under 35 U.S.C. § 119 to Korean Patent Application No. 10-2022-0171842, filed on Dec. 9, 2022, in the Korean Intellectual Property Office, the disclosure of which is incorporated by reference herein in its entirety.

BACKGROUND

1. Field

The disclosure relates to a wireless communication system (or a mobile communication system). Specifically, the disclosure relates to a method for encoding and decoding using a cyclic redundancy check (CRC) bit.

2. Description of Related Art

Considering the development of wireless communication from generation to generation, the technologies have been developed mainly for services targeting humans, such as voice calls, multimedia services, and data services. Following the commercialization of 5G (5th generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-input Multiple-Output (MIMO), Full Dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, High-Altitude Platform Stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of Artificial Intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

A receiving node may decode an encoded signal received from a transmitting node. For example, the signal encoded at the transmitting node may include a plurality of information bits and redundancy bits concatenated with the plurality of the information bits, and the receiving node may decode the plurality of the information bits and the redundancy bits.

Meanwhile, the receiving node may use a search tree scheme for the decoding. In case that the receiving node decodes the encoded bits using the search tree scheme and performs re-search due to failing in one search path, the receiving node may need to return to a node already searched. Also, in case that the redundancy bits are concatenated after the plurality of the information bits, a search space may increase in the search tree scheme.

In case that the receiving node performs the decoding, the search space increases and the time taken to re-search for the search path, thus causing a high latency and a high block error rate (BLER).

According to an embodiment of the disclosure, a method performed by a transmitting node in a wireless communication system may include encoding a plurality of information bits using a plurality of cyclic redundancy check (CRC) bits, interleaving the plurality of the information bits and the plurality of the CRC bits using an interleaving pattern, generating a codeword by performing convolution-encoding and polar-encoding on the plurality of the interleaved information bits and the plurality of the interleaved CRC bits, and transmitting the codeword to a receiving node. The interleaving pattern may correspond to a matrix generated based on a size of the plurality of the information bits and a size the plurality of the CRC bits.

According to an embodiment of the disclosure, a transmitting node in a wireless communication system may include a transceiver and a controller. The controller may be configured to encode a plurality of information bits using a plurality of CRC bits, interleave the plurality of the information bits and the plurality of the CRC bits using an interleaving pattern, generate a codeword by convolution-encoding and polar-encoding the plurality of the interleaved information bits and the plurality of the interleaved CRC bits, and transmit the codeword to a receiving node. The interleaving pattern may correspond to a matrix generated based on a size of the plurality of the information bits and a size the plurality of the CRC bits, According to an embodiment of the disclosure, a method performed by a receiving node in a wireless communication system may include receiving a codeword including a plurality of information bits and a plurality of CRC bits from a transmitting node, and decoding the plurality of the CRC bits included in the received codeword and interleaved using the interleaving pattern. The plurality of the information bits and the plurality of the CRC bits may be interleaved using an interleaving pattern. The interleaving pattern may correspond to a matrix generated based on a size of the plurality of the information bits and a size the plurality of the CRC bits.

According to an embodiment of the disclosure, a receiving node in a wireless communication system may include a transceiver and a controller. The controller may be configured to receive a codeword including a plurality of information bits and a plurality of CRC bits from a transmitting node, and decode the plurality of the CRC bits included in the received codeword and interleaved using the interleaving pattern. The plurality of the information bits and the plurality of the CRC bits may be interleaved using an interleaving pattern. The interleaving pattern may correspond to a matrix generated based on a size of the plurality of the information bits and a size the plurality of the CRC bits.

According to an embodiment, the transmitting node or the receiving node may reduce or minimize the latency or the BLER.

Besides, various effects obtained directly or indirectly from this document may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

In connection with description of the drawings, the same or similar reference numerals may be used for the same or similar elements.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to the accompanying drawings. However, it should be understood that the disclosure is not limited to specific embodiments, but rather includes various modifications, equivalents and/or alternatives of various embodiments of the disclosure.

Figure 1:
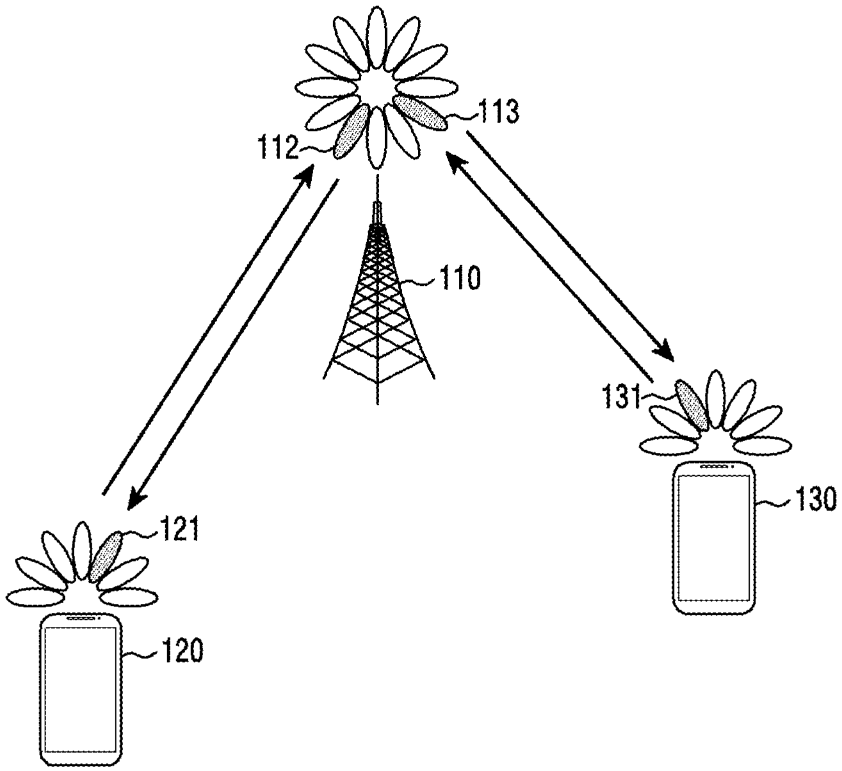
FIG. 1 illustrates a wireless communication system according to an embodiment of the present disclosure.

FIG. 1 illustrates a wireless communication system according to an embodiment of the present disclosure.

Referring to FIG. 1, a base station 110, a terminal 120, and/or a terminal 130 are represented, as some of nodes using radio channels in the wireless communication system. FIG. 1 shows only one base station, but this is merely an example. The wireless communication system of FIG. 1 may further include another base station identical or similar to the base station 110.

The base station 110 is a network infrastructure which provides radio access to the terminals 120 and 130. The base station 110 may have coverage defined as a specific geographic area based on a signal transmission distance. In addition to the base station, the base station 110 may be referred to as an "access point (AP)," an "eNodeB (eNB)," a "gNodeB (gNB)," a "5th generation (5G) node," a "wireless point," a "transmission/reception point (TRP)" or other term having the equivalent technical meaning.

The first terminal 120 and the second terminal 130 each are used by a user, and may perform communication with the base station 110 through the radio channel. At least one of the first terminal 120 and the second terminal 130 may be operated without the user's involvement. For example, at least one of the first terminal 120 or the second terminal 130 may be a device which performs machine type communication (MTC), and may not be carried by the user. In addition to the terminal, the first terminal 120 and the second terminal 130 each may be referred to as a "user equipment (UE)," a "mobile station," a "subscriber station," a "customer premises equipment (CPE)," a "remote terminal," a "wireless terminal," an "electronic device," or a "user device," or other term having the technically identical meaning.

The base station 110, the first terminal 120, and the second terminal 130 may transmit and/or receive a radio signal in a millimeter wave (mmWave) band (e.g., 28 GHz, 30 GHz, 38 GHz, 60 GHz). In so doing, to improve a channel gain, the base station 110, the first terminal 120, and/or the second terminal 130 may perform beamforming. For example, the first terminal 120 may transmit a radio frequency (RF) signal to the base station 110 or receive an RF signal from the base station 110 based on a first beam 121. For example, the base station 110 may transmit an RF signal to the first terminal 120 or receive an RF signal from the first terminal 120 based on a second beam 112. For example, the base station 110 may transmit an RF signal to the second terminal 130 or receive an RF signal from the second terminal 130 based on a third beam 113. For example, the second terminal 130 may transmit an RF signal to the base station 110 or receive an RF signal from the base station 110 based on a third beam 131.

The beamforming may include transmit beamforming and/or receive beamforming. That is, the base station 110, the first terminal 120, and/or the second terminal 130 may give directivity to a transmit signal or a receive signal. To give the directivity to a receive signal, the base station 110 and/or the terminals 120 and 130 may select the serving beams 112, 113, 121, and 131 through a beam search or beam management procedure. After the serving beams 112, 113, 121, and 131 are selected, communication may be performed through resources which are quasi co-located (QCL) with resources transmitting the serving beams 112, 113, 121, and 131.

The base station 110, the first terminal 120, and the second terminal 130 of the disclosure each may be a transmitting apparatus, a transmitting node, a receiving apparatus, and/or a receiving node. For example, the base station 110 may transmit an RF signal to the first terminal 120. For example, the base station 110 may receive an RF signal from the first terminal 120. Aa another example, the first terminal 120 may transmit an RF signal to the base station 110 or the second terminal 130. The first terminal 120 may receive an RF signal from the base station 110 or the second terminal 130.

Figure 2:
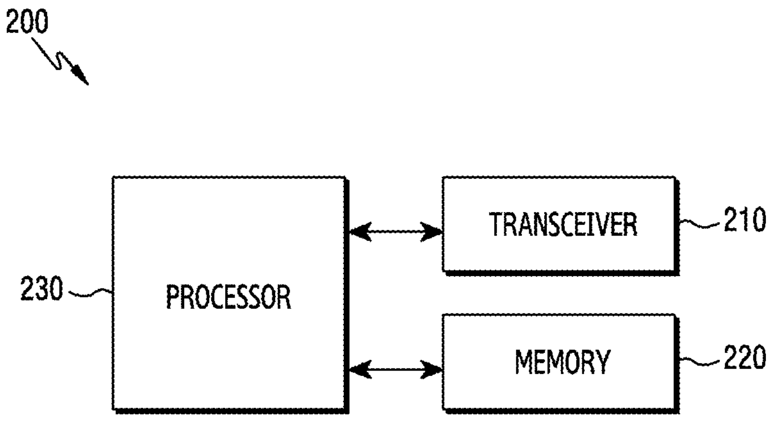
FIG. 2 illustrates a structure of a terminal according to an embodiment of the present disclosure.

FIG. 2 illustrates a structure of a terminal according to an embodiment of the present disclosure.

Referring to FIG. 2, a terminal 200 may include a transceiver 210, a memory 220 and/or a processor 230 according to an embodiment. The disclosure describes that the terminal 200 includes the transceiver 210, the memory 220 and/or the processor 230, but this is merely an example. For example, the terminal 200 may further include other component than the transceiver 210, the memory 220 and the processor 230. For example, the processor 230 may be replaced by a controller.

According to an embodiment, the transceiver 210, the memory 220 and the processor 230 each may be implemented or formed as a separate chip. However, this is merely an example and the transceiver 210, the memory 220 and/or the processor 230 may be implemented or formed as a single chip.

According to an embodiment, the transceiver 210 may receive at least one transmitter and/or at least one receiver. For example, the transceiver 210 may include an RF transmitter for amplifying and up-converting a frequency of a transmitted signal. The transceiver 210 may include an RF receiver for down-converting a frequency of a received signal and low-noise-amplifying the signal.

The components of the transceiver 210 described in the disclosure are merely exemplary, and the components of the transceiver 210 are not limited to the RF transmitter and the RF receiver. For example, the transceiver 210 may further include a coupler for obtaining isolation between the RF transmitter and the RF receiver.

According to an embodiment, the transceiver 210 may transmit or receive a signal to or from the processor 230. For example, the transceiver 210 may transmit or deliver the RF signal receiver over the wireless communication channel to the processor 230. The transceiver 210 may receive an RF signal from the processor 230.

According to an embodiment, the transceiver 210 may be referred to as a UE transmitter or a UE receiver.

According to an embodiment, the transceiver 210 may transmit a signal to a base station (e.g., the base station 110 of FIG. 1) or a network entity (e.g., a user plane function (UPF) entity) or receive a signal from the base station or the network entity. In an embodiment, the transmitted or received signal may include a control signal and data.

According to an embodiment, the memory 220 may include or store a program or data required for the operations of the terminal 200. For example, the memory 220 may be a non-transitory memory, and the program stored in the non-transitory memory may be intimately coupled with hardware configuration (e.g., the processor 230 or the transceiver 210) of the terminal 200. The memory 220 may store the control information or the data included in the signal obtained by the terminal 200. In an embodiment, the memory 220 may include a read-only memory (ROM), a random access memory (RAM), a hard disk, a compact disk (CD)-ROM, a digital versatile disk (DVD), and/or a storage medium.

According to an embodiment, the processor 230 may include one processor or a plurality of processors. For example, the processor 230 may include a communication processor. For example, the processor 230 may include a communication processor and/or an application processor.

According to an embodiment, the processor 230 may control a series of processes performed by the terminal 200. For example, the transceiver 210 may receive a data signal including control information transmitted by the base station or the network entity. The processor 230 may process the received control signal and data signal.

The term "processor" in the disclosure may be replaced by various terms which execute or perform the operations of the terminal 200. For example, the processor may be replaced with a controller or a computing circuit.

The terminal 200 of the disclosure may correspond to the first terminal 120 and/or the second terminal 130 of FIG. 1.

Figure 3:
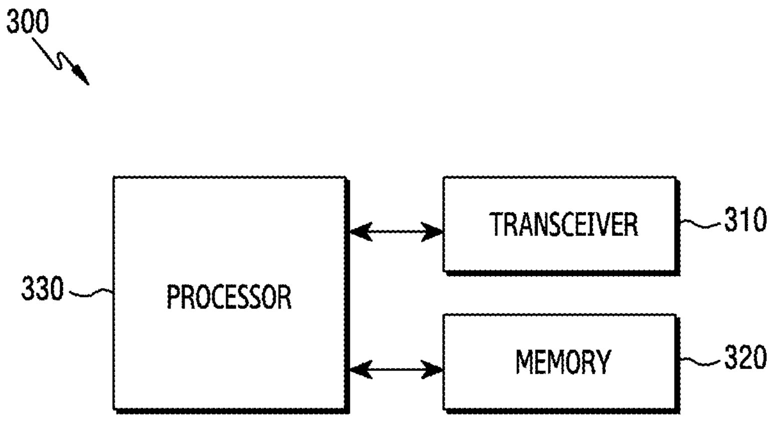
FIG. 3 illustrates a structure of a base station according to an embodiment of the present disclosure.

FIG. 3 illustrates a structure of a base station according to an embodiment of the present disclosure.

Referring to FIG. 3, a base station 300 may include a transceiver 310, a memory 320 and/or a processor 330 according to an embodiment. The disclosure describes that the base station 300 includes the transceiver 310, the memory 320 and/or the processor 330, but this is merely an example. For example, the base station 300 may further include other component than the transceiver 310, the memory 320 and the processor 330. As another example, the processor 330 may be replaced by a controller.

According to an embodiment, the transceiver 310, the memory 320 and the processor 330 each may be implemented or formed as a separate chip. However, this is merely an example and the transceiver 310, the memory 320 and/or the processor 330 may be implemented or formed as a single chip.

According to an embodiment, the transceiver 310 may receive at least one transmitter and/or at least one receiver. For example, the transceiver 310 may include an RF transmitter for amplifying and up-converting a frequency of a transmitted signal. The transceiver 310 may include an RF receiver for down-converting a frequency of a received signal and low-noise-amplifying the signal.

The components of the transceiver 310 described in the disclosure are merely exemplary, and the components of the transceiver 310 are not limited to the RF transmitter and the RF receiver. For example, the transceiver 310 may further include a coupler for obtaining isolation between the RF transmitter and the RF receiver.

According to an embodiment, the transceiver 310 may transmit or receive a signal to or from the processor 330. For example, the transceiver 310 may transmit or deliver an RF signal receiver over a wireless communication channel to the processor 330. The transceiver 310 may receive an RF signal from the processor 330.

According to an embodiment, the transceiver 310 may be referred to as a base station transmitter or a base station receiver.

According to an embodiment, the transceiver 310 may transmit a signal to the terminal 200 or receive a signal from the terminal 200. In an embodiment, the transmitted or received signal may include a control signal and data.

According to an embodiment, the memory 320 may include or store a program or data required for the operations of the base station 300. For example, the memory 320 may be a non-transitory memory, and the program stored in the non-transitory memory may be intimately coupled with hardware configuration (e.g., the processor 330 or the transceiver 310) of the base station 300. The memory 320 may store the control information or the data included in the signal obtained by the base station 300. In an embodiment, the memory 320 may include a ROM, a RAM, a hard disk, a CD-ROM, a DVD, and/or a storage medium.

According to an embodiment, the processor 330 may include one processor or a plurality of processors. For example, the processor 330 may include a communication processor. For example, the processor 330 may include a communication processor and/or an application processor.

According to an embodiment, the processor 330 may control a series of processes performed by the base station 300. For example, the transceiver 310 may receive a data signal including control information transmitted by the base station or the network entity. The processor 330 may process the received control signal and data signal.

The term "processor" in the disclosure may be replaced by various terms which execute or perform the operations of the base station 300. For example, the processor may be replaced with a controller or a computing unit.

Figure 4:
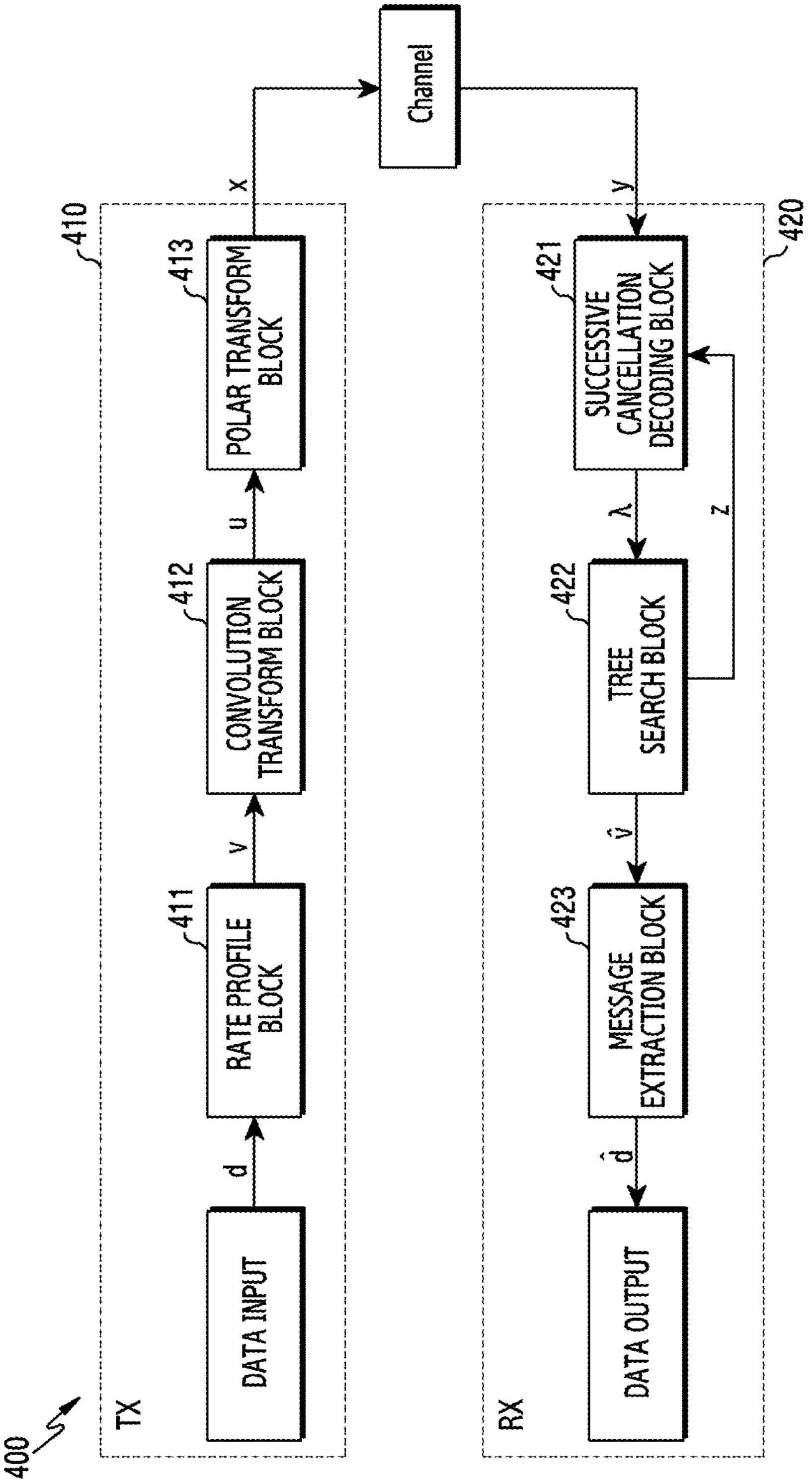
FIG. 4 illustrates polarization-adjusted convolutional (PAC) coding according to an embodiment of the present disclosure.

FIG. 4 illustrates polarization-adjusted convolutional (PAC) coding according to an embodiment of the present disclosure.

Referring to FIG. 4, a wireless communication network 400 according to an embodiment may include a transmitting node 410 and/or a receiving node 420.

According to an embodiment, the transmitting node 410 and the receiving node 420 may correspond to a terminal (e.g., the terminal 200 of FIG. 2) or a base station (e.g., the base station 300 of FIG. 3) respectively. For example, the transmitting node 410 may correspond to the base station

300, and the receiving node 420 may correspond to the terminal 200. The transmitting node 410 may transmit an RF signal to the receiving node 420 over a radio communication channel, and the receiving node 420 may receive the RF signal from the transmitting node 410 over the radio communication channel.

For example, the transmitting node 410 may correspond to a first terminal (e.g., the first terminal 120 of FIG. 1), and the receiving node 420 may correspond to a second terminal (e.g., the second terminal 130 of FIG. 1). The transmitting node 410 may perform sidelink communication by transmitting an RF signal to the receiving node 420.

According to an embodiment, the RF signal transmitted from the transmitting node 410 to the receiving node 420 may include encoded bits, and the encoded bits may be decoded at the receiving node 420. Hereafter, decoding the encoded bits using the PAC coding scheme is described.

According to an embodiment, the transmitting node 410 may include a rate profile block 411, a convolution transform block 412 and/or a polar transform block 413.

According to an embodiment, data may be inputted to the rate profile block 411. For example, a data vector d may be inputted to the rate profile block 411, and the data vector may be referred to as a specific number of bits. For example, the data vector may be referred to as $d=\{d_0, d_1, \ldots, d_{A-1}\}$. The number of the bits of the data vector may be A.

According to an embodiment, the rate profile block 411 may perform rate profiling on the inputted data vector d. For example, the rate profile block 411 may transform the data vector d into a rate-profiled vector v including information bits comprising information to transmit and frozen bits without information in a specific rule (or order) based on (or using) a preset sequence.

According to an embodiment, the rate profiled vector including the inserted frozen bits may be referred to as $V=\{v_0, v_1, \ldots v_{N-1}\}$. The number of the bits of the rate profiled vector may be N, and the number of the inserted frozen bits may be N-A. In an embodiment, the number of at least one frozen bit inserted or concatenated may be preset. For example, the number of at least one frozen bit inserted or concatenated may correspond to the information bits included in the data vector d or a type of the information bits. According to an embodiment, as the rate profile block 411 inserts the frozen bits into the data vector v, even in case that some of the bits included in the RF signal transmitted from the transmitting node 410 are lost due to the wireless communication channel, loss of the data bits included in the RF signal may be minimized or reduced.

According to an embodiment, the rate profile block 411 may output the rate profiled vector v to the convolution transform block 412.

According to an embodiment, the rate profiled vector v may be transmitted or delivered from the rate profile block 411 to the convolution transform block 412. The convolution transform block 412 may obtain a convolution transformation (CT) vector using [Equation 1]:

$$u=vG \qquad \text{[Equation 1].}$$

In [Equation 1], u is the CT vector, and V is the rate profiled vector. G is a conventional generator polynomial and may be obtained or acquired from a conventional generator polynomial $g=[g_0, g_1, \ldots, g_{m-1}]$.

According to an embodiment, the convolution transform block 412 may output the obtained CT vector u to the polar transform block 413.

According to an embodiment, the polar transform block 413 may receive the CT vector u from the convolution transform block 412. The polar transform block 413 may convert the received CT vector u into a codeword (or a codeword vector) x. For example, the polar transform block 413 may transform the CT vector u into the codeword x using [Equation 2]. For example, the polar transform block 413 may obtain the codeword x based on the CT vector u:

$$x=uP_n \qquad \text{[Equation 2].}$$

In [Equation 2], x is the codeword, u is the CT vector, and $P_n$ is a specific polar code generator matrix. For example, the polar code generator matrix may be acquired using $P_n=P^{\otimes n}$, in case that an Arikan kernel is $$P=\begin{bmatrix}1 & 0\\ 1 & 1\end{bmatrix}.$$

In an embodiment, $P^{\otimes n}$ may be referred to as an n-th Kronecker product of the matrix P.

According to an embodiment, the polar transform block 413 may output the obtained codeword (or the codeword vector) x, and transmit the outputted codeword (or the codeword vector) x to the receiving node 420.

According to an embodiment, the polar-transformed codeword x may be transmitted to the receiving node 420 over the wireless communication channel. For example, the codeword may be referred to as a message including the data bits or information including the data bits.

According to an embodiment, the receiving node 420 may include a successive cancellation decoding block 421, a tree search block 422 and/or a message extraction block 423.

According to an embodiment, the receiving node 420 may receive a codeword (or a codeword vector) y passing through the wireless communication channel from the transmitting node 410. The codeword y received over the wireless communication channel may be different from the codeword x. For example, the codeword x transmitted from the transmitting node 410 may be affected by a channel environment during the transmission to the receiving node 420 over the wireless communication channel, and the codeword y received at the receiving node 420 may differ from the codeword x transmitted by the transmitting node 410. For example, the channel environment may vary depending on a location change of the transmitting node 410 or the receiving node 420.

According to an embodiment, the codeword y received at the receiving node 420 may be inputted to the successive cancellation decoding block 421 of the receiving node 420. The successive cancellation decoding block 421 may calculate a reliability value of each of the bits required to decode the inputted codeword y in the tree search manner and thus deliver or transmit the reliability value to the tree search block 422. For example, the reliability value of each of the bits delivered to the tree search block 422 may be used for Fano decoding. In an embodiment, the successive cancellation decoding block 421 may operate as a polar code decoder.

According to an embodiment, the tree search block 422 may perform the decoding using the search tree scheme with a reliability value $\lambda$ of a specific bit received. The tree search block 422 may deliver decoded bits $\hat{u}$ to the successive cancellation decoding block 421.

According to an embodiment, the successive cancellation decoding block 421 and the tree search block 422 may repeat the above operations until the decoding is completed, and decode the received codeword y. In case that the decoding is finished based on a specific criterion, the tree search block 422 may output a vector $\hat{v}$ including the decoding bits to the message extraction block 423.

According to an embodiment, the message extraction block 423 may receive the vector $\hat{v}$ including the decoding bits from the tree search block 422. The message extraction block 423 may extract a message from the vector $\hat{v}$ including the decoded bits.

According to an embodiment, the message extraction block 423 may extract a data vector $\hat{d}$ estimated from the vector $\hat{v}$ including the decoded bits. The message extraction block 423 may deliver the estimated data vector $\hat{d}$ to the processor or the controller of the receiving node 420.

It may be understood that the blocks of the transmitting node 410 of the disclosure are performed substantially by at least one processor or controller of the transmitting node 410. For example, it may be understood that the function of the rate profile block 411 of the transmitting node 410 is performed substantially by at least one processor or controller of the transmitting node 410.

It may be understood that the blocks of the receiving node 420 of the disclosure are performed substantially by at least one processor or controller of the receiving node 420. For example, it may be understood that the function of the successive cancellation decoding block 421 of the receiving node 420 is performed substantially by at least one processor or controller of the receiving node 420.

It may be understood that the block of the disclosure indicates a layer or a module which performs a specific function. Hence, the term "block" of the disclosure may be replaced by the layer or the module. For example, the rate profile block 411 may be referred to as a rate profile layer or a rate profile module. For example, the successive cancellation decoding block 421 may be referred to as a successive cancellation layer or a successive cancellation module.

The transmitting node 410 of the disclosure may be replaced by a transmitting apparatus, a transmitter or a transmitting device. The receiving node 420 may be replaced by a receiving apparatus, a receiver or a receiving device.

Figure 5:
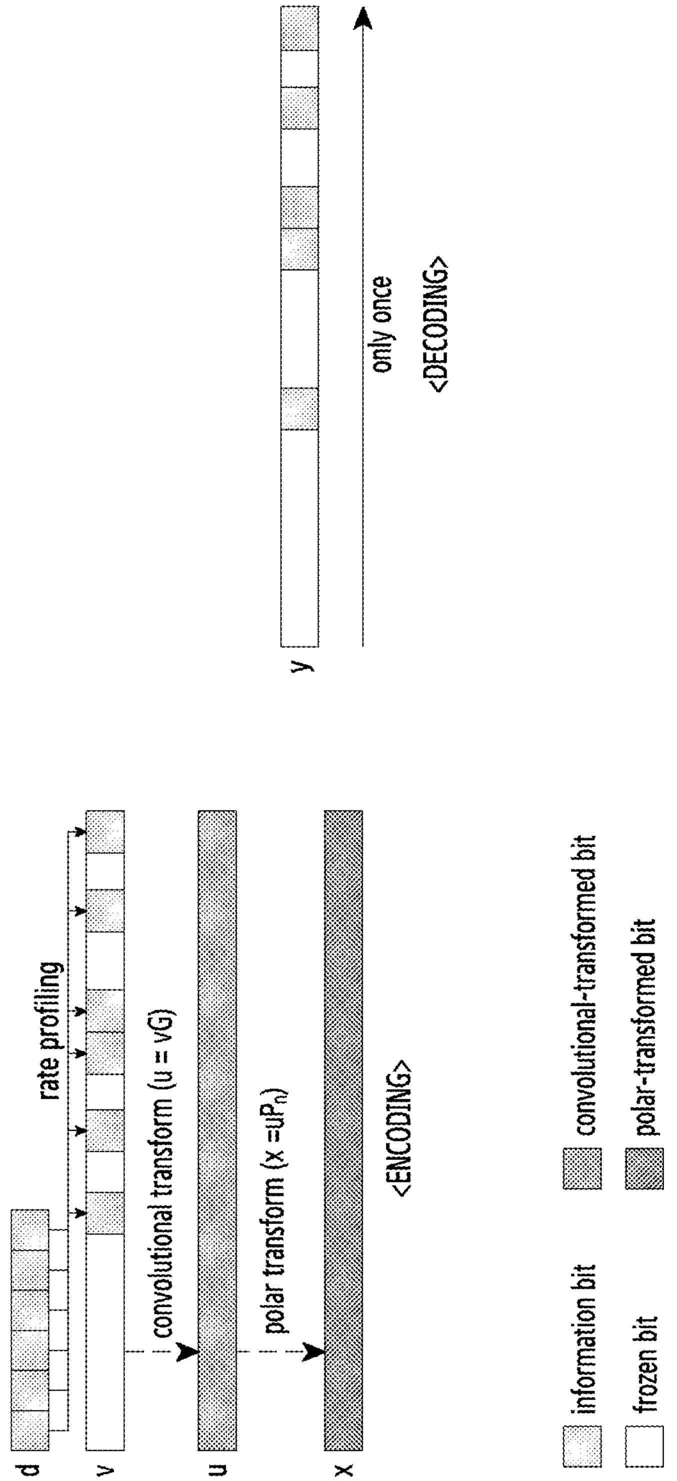
FIG. 5 illustrates encoding and decoding illustrated in FIG. 4 according to an embodiment of the present disclosure.

FIG. 5 illustrates encoding and decoding explained in FIG. 4 according to an embodiment of the present disclosure.

Referring to FIG. 5, the data vector d may include a plurality of information bits and/or a plurality of CRC bits according to an embodiment. The transmitting node 410 may perform the rate profiling on the data vector d. According to the rate profiling, the rate profiled vector v may include a plurality of information bits (or data bits) and a plurality of frozen bits.

According to an embodiment, the transmitting node 410 may obtain the CT vector u by convolution-transforming the rate profiled vector v. The transmitting node 410 may obtain the codeword x by polar-transforming the CT vector u. In an embodiment, the transmitting node 410 may transmit the obtained codeword x to the receiving node 420.

According to an embodiment, the receiving node 420 may decode the received codeword y. The decoding may be performed by the receiving node 420 in sequence from a specific column. For example, the receiving node 420 may decode a first bit received among the bits included in the received codeword y.

According to an embodiment, the receiving node 420 may decode the received codeword y only once. For example, the receiving node 420 may sequentially decode the plurality of the bits of the codeword y only once.

Figure 6:
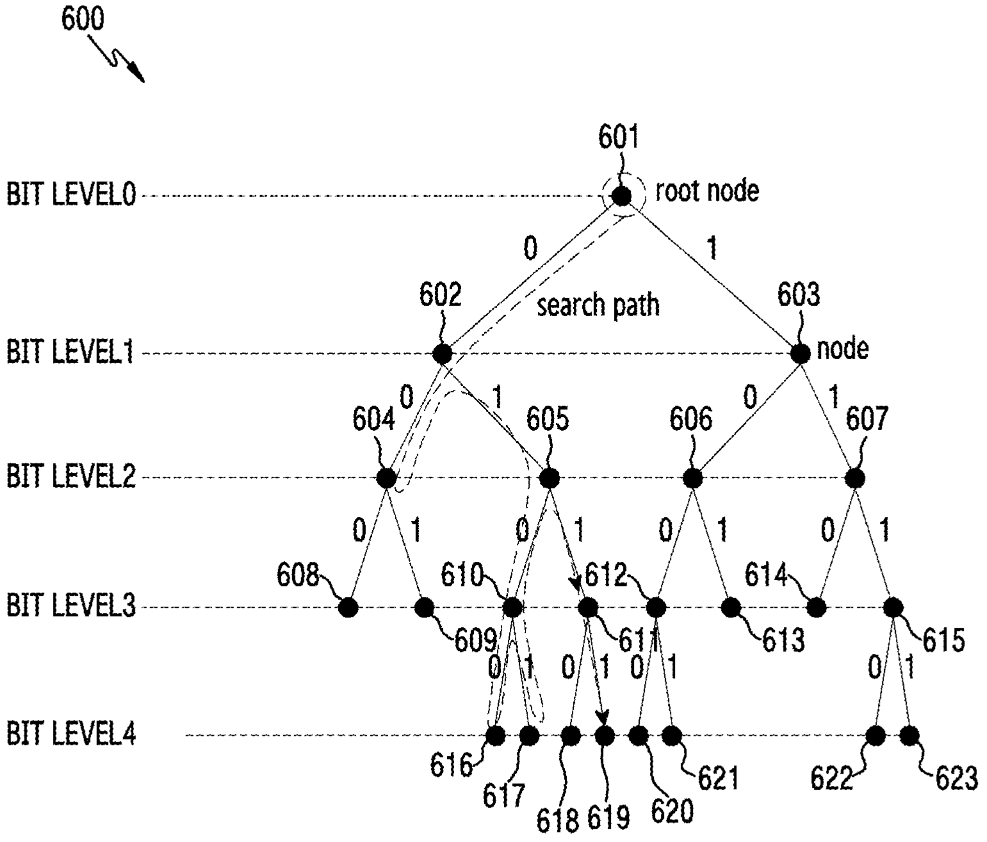
FIG. 6 illustrates a decoding method based on a search tree scheme according to an embodiment of the present disclosure.

FIG. 6 illustrates a decoding method based on a search tree scheme according to an embodiment of the present disclosure.

Referring to FIG. 6, a search tree 600 for decoding 4 bits is depicted according to an embodiment. The search tree 600 may be configured with a plurality of nodes. As another example, the search tree 600 may include a plurality of nodes.

According to an embodiment, the search tree 600 may include nodes having various bit levels. For example, the search tree 600 may include a first node 601 of the bit level 0. The search tree 600 may include a second node 602 and a third node 603 of the bit level 1. The search tree 600 may include a fourth node 604, a fifth node 605, a sixth node 606 and a seventh node 607 of the bit level 2. The search tree 600 may include an eighth node 608, a ninth node 609, a 10th node 610, an 11th node 611, a 12th node 612, a 13th node 613, a 14th node 614 and a 15th node 615 of the bit level 3. The search tree 600 may include a 16th node 616, a 17th node 617, an 18th node 618, a 19th node 619, a 20th node 620, a 21st node 621, a 22nd node 622 and a 23rd node 623 of the bit level 4. The number of the nodes and the level of the search tree 600 may vary based on or depending on a code length. As another example, the number of the nodes and the level of the search tree 600 may be determined based on the code length.

According to an embodiment, the first node 601 may be a root node. The nodes of the search tree 600 may be connected by paths.

According to an embodiment, the receiving node 420 may perform the decoding according to a depth first search (DFS) scheme or algorithm. For example, the successive cancellation decoding block 421 and the tree search block 422 of the receiving node 420 may perform the decoding according to the DFS scheme. In an embodiment, the DFS scheme may indicate a search scheme which first searches the depth in the search tree. For example, the DFS scheme may start from the root node (e.g., the first node 601) or an arbitrary node, search to a maximum depth (e.g., the bit level 4), return to the node and then search another node.

FIG. 6 of the disclosure explains based on the DFS scheme but this is merely an example. For example, the receiving node 420 may perform the decoding by the search tree scheme using a breath first search (BFS) scheme. The BFS scheme may first explore the breath.

According to an embodiment, the receiving node 420 may decode the first bit of the received bits (e.g., 4 bits), and determine the search path to the second node 602 in case that the first bit is determined or estimated as "0" as the result of the first bit decoding. In case that a second bit is determined or estimated as "0" as the result of the second bit decoding, the receiving node 420 may determine the search path to the fourth node 604.

If decoding the third bit but not determining the third bit as "0" or "1," the receiving node 420 may return to the second node 602. For example, the receiving node 420 may compare a reliability value of the third bit with a threshold value of the third bit, and return to the second node 602 in case that the reliability value of the third bit is lower than the threshold value of the third bit as a result of the comparison.

As another example, in case that the third bit is determined as "0," the receiving node 420 may compare the reliability value of the determined third bit and the threshold value of the third bit, and determine or estimate the third bit as "1" in case that the reliability value of the determined third bit is lower than the threshold value of the third bit. The receiving node 420 may compare the reliability value of the third bit determined as "1" and the threshold value of the third bit, and return to the second node 602 in case that the reliability value of the determined third bit determined as "1" is lower than the threshold value of the third bit. In an embodiment, returning from the fourth node 604 to the second node 602 may be referred to as "backward."

According to an embodiment, the receiving node 420 may return to the second node 602 and then determine the search path to the fifth node 605.

According to an embodiment, the receiving node 420 may determine the 10th node 610, the 16th node 616, the 17th node 617, the 11th node 611 and the 19th node 619 as the search path in the above manner. As a result, the receiving node 420 may decode the plurality of the bits (e.g., 4 bits) received from the transmitting node 410 into "0111."

In the disclosure, determining the search path (or the path) from the node of the low bit level to the node of the high bit level may be substantially referred to as "forward." For example, determining the search path from the second node 602 to the fourth node 604 at the receiving node 420 may be substantially referred to as forwarding the search path from the second node 602 to the fourth node 604.

In the disclosure, determining the search path (or the path) from the node of the high bit level to the node of the low bit level may be substantially referred to as "backward." For example, determining the search path from the fourth node 604 to the second node 602 at the receiving node 420 may be substantially referred to as back warding the search path from the fourth node 604 to the second node 602.

In the disclosure, determining the search path between the nodes of the same bit level may be substantially referred to as "lateral (or looking another option)." For example, determining the search path from the fourth node 604 to the fifth node 605 at the receiving node 420 may be substantially referred to as proceeding the search path from the fourth node 604 to the fifth node 605 in "another option."

If the plurality of the received bits is decoded according to the tree search scheme explained in FIG. 6 of the disclosure, a wide search space may be formed. For example, $2^n$-ary nodes may be generated to decode an n-th bit, and the receiving node 420 may need to identify all of the $2^n$-ary nodes for each bit level.

The n-ary bits may include the plurality of the information bits and the CRC bits. In case that the CRC bits are concatenated to the plurality of the information bits and the decoding order of the CRC bits is determined to be behind the plurality of the information bits, it is necessary to decode by building a search tree (e.g., the search tree 600) with respect to all of the plurality of the information bits.

Hence, the following describes a solution for reducing or minimizing a search space by interleaving a plurality of CRC bits based on an interleaving pattern.

Figure 7A:
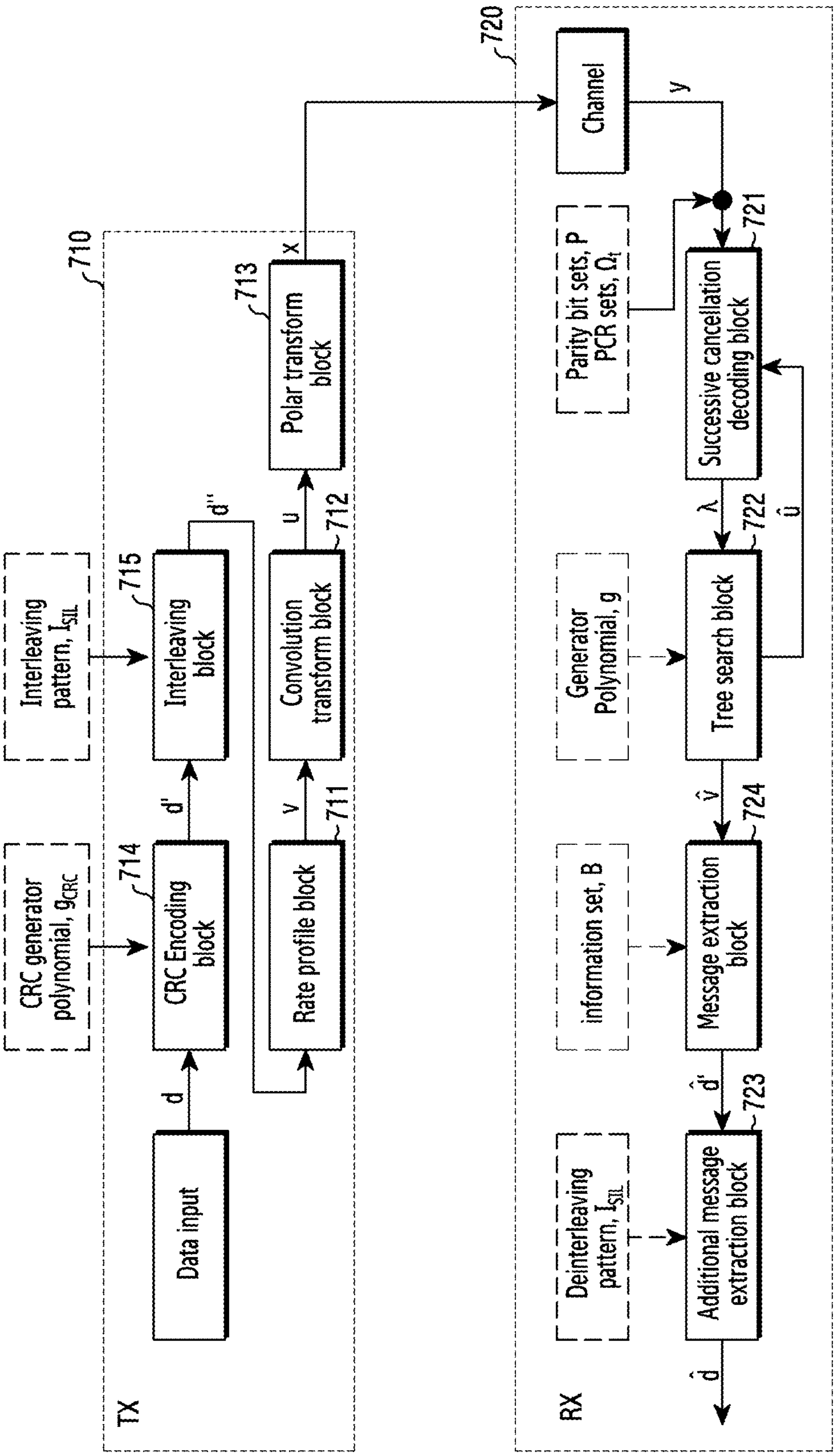
FIG. 7A illustrates a transmitting node which encodes based on a PAC coding scheme and a receiving node which decodes based on the PAC coding scheme according to an embodiment of the present disclosure.

FIG. 7A illustrates a transmitting node which encodes based on a PAC coding scheme and a receiving node which decodes based on the PAC coding scheme according to an embodiment of the present disclosure.

Referring to FIG. 7A, a transmitting node 710 according to an embodiment may include a rate profile block 711, a convolution transform block 712, a polar transform block 713, a CRC encoding block 714 and/or an interleaving block 715.

The transmitting node 710 of FIG. 7A of the disclosure may encode bits according to the PAC coding scheme, and the transmitting node 710 of FIG. 7A may further include the CRC encoding block 714 and/or the interleaving block 715 compared to the transmitting node 410 of FIG. 4. The rate profile block 711, the convolution transform block 712 and the polar transform block 713 of FIG. 7A of the disclosure may correspond to the rate profile block 411, the convolution transform block 412 and the polar transform block 413 of FIG. 4.

According to an embodiment, data may be inputted to the CRC encoding block 714 of the transmitting node 710. For example, a data vector d may be inputted to the CRC encoding block 714.

According to an embodiment, the CRC encoding block 714 may encode a plurality of CRC bits into a plurality of information bits to transmit to the receiving node 720. For example, the CRC encoding block 714 may concatenate, insert or add the plurality of the CRC bits to the last bit of the plurality of the information bits. For example, the CRC-encoded vector may be a CRC encoded vector d'. That is, the CRC encoding block 714 may output the CRC encoded vector d' in response to the inputted data vector d.

According to an embodiment, the CRC encoding block 714 of the transmitting node 710 may identify or generate a specific matrix (e.g., a CRC generator matrix) based on a CRC generator polynomial.

According to an embodiment, the specific matrix (e.g., a CRC generator matrix) may be a matrix for identifying or generating an interleaving pattern for interleaving a plurality of information bits and a plurality of CRC bits.

According to an embodiment, the specific matrix (e.g., a CRC generator matrix) may include an identity matrix and a parity matrix. In an embodiment, the identity matrix may be a square matrix in which main diagonal components are all 1 and other components are 0. The parity matrix may be a matrix in which matrix components or elements are values corresponding to parity of the CRC bits.

The identity matrix of the disclosure may be referred to as an identity matrix part of the specific matrix, and the parity matrix may be referred to as a parity matrix part of the specific matrix.

According to an embodiment, the specific matrix $G_{CRC}$ may be defined by [Equation 3]:

$$G_{CRC}=[I_A:P] \quad \text{[Equation 3].}$$

For example, assuming that the size of the identity matrix $I_A$ is A and the size of the parity matrix P is L, $I_A=[e_0, e_1, \ldots, e_{A-1}]$ and $P=[p_0, p_1, \ldots, p_{L-1}]$ in [Equation 3].

According to an embodiment, the CRC encoding block 714 of the transmitting node 710 may generate a matrix corresponding to the interleaving pattern based on the specific matrix (e.g., a CRC generator matrix). For example, the CRC encoding block 714 may identify or generate the specific matrix (e.g., a CRC generator matrix) based on the size (e.g., A) of the plurality of the information bits and the size (e.g., L) of the plurality of the CRC bits. In an embodiment, the specific matrix (e.g., a CRC generator matrix) may be $G_{CRC}=[e_0, e_1, \ldots, e_{A-1}:p_0, p_1, \ldots, p_{L-1}]$.

For example, the CRC encoding block 714 may identify or generate the matrix corresponding to the interleaving pattern by permuting the specific matrix (e.g., a CRC generator matrix). In an embodiment, the identified or generated matrix may be $G'_{CRC}=[e_0, \ldots, p_0, e_1, \ldots, p_{A+L-1}]$. The identified or generated matrix $G'_{CRC}$ may be a matrix permuting at least some of columns of the specific matrix $G_{CRC}$.

According to an embodiment, the CRC encoding block 714 may identify the interleaving pattern using the generated matrix based on the specific matrix. For example, the CRC encoding block 714 may identify the interleaving pattern $I_{SIL}$ using the generated matrix $G'_{CRC}$.

According to an embodiment, the interleaving block 715 may interleave the plurality of the information bits and the plurality of the CRC bits based on the identified interleaving pattern $I_{SIL}$. For example, the interleaving block 715 may interleave the bits included in the CRC encoded vector d' using the interleaving pattern $I_{SIL}$, and output an interleaved vector d". Determining the interleaving pattern $I_{SIL}$ at the interleaving block 715 is described in detail. For example, Determining the interleaving pattern is explained in FIG. 10.

The term "interleave" in the disclosure may indicate changing the arrangement (or, arrangement order) or the order of the plurality of the bits. Hence, the term "interleave" may be replaced by arrange, rearrange, or distribute.

According to an embodiment, the rate profile block 711 may receive the interleaved vector d" from the interleaving block 715, and rate-profile the interleaved vector d". The convolution transform block 712 and the polar transform block 713 may perform the convolution transform and the polar transform as described in FIG. 4.

According to an embodiment, the receiving node 720 may include a successive cancellation decoding block 721, a tree search block 722, a message extraction block 723, and/or an additional message extraction block 724.

The receiving node 720 of FIG. 7A of the disclosure may further include the additional message extraction block 724 compared to the receiving node 420 of FIG. 4. The successive cancellation decoding block 721, the tree search block 722 and the message extraction block 723 of FIG. 7A of the disclosure may correspond to the successive cancellation decoding block 421, the tree search block 422 and the message extraction block 423 of FIG. 4.

According to an embodiment, the receiving node 720 may receive a parity check relationship (PCR) set $\Omega_t$ from the transmitting node 710. In an embodiment, the receiving node 720 may decode using the PCR set $\Omega_t$. For example, the codeword y received from the transmitting node 710 may include a plurality of bits, and the plurality of the bits may be interleaved by the interleaving pattern identified at the transmitting node 710. Hence, to decode based on the received codeword y from the transmitting node 710, the receiving node 720 may need to receive the PCR set $\Omega_t$ including information on order or arrangement (or, arrangement order) of the plurality of the bits included in the received codeword y.

Figure 12:
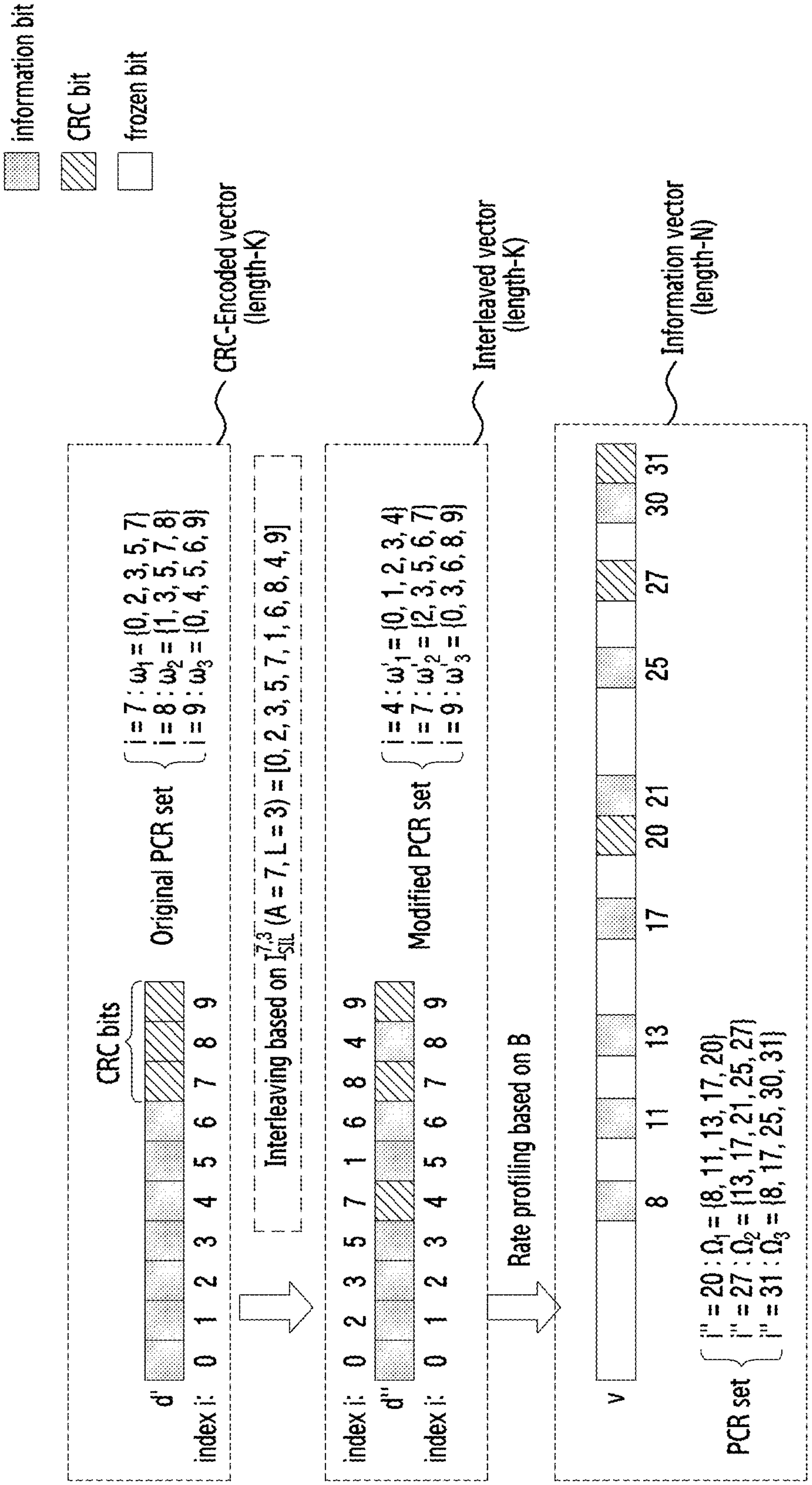
FIG. 12 illustrates changing parity check relationship (PCR) sets according to an embodiment of the present disclosure.

Obtaining the PCR set $\Omega_t$ identified or received by the receiving node 720 of the disclosure may be elucidated in FIG. 12.

According to an embodiment, the additional message extraction block 724 of the receiving node 720 may extract a vector $\hat{d}'$ including first decoded data from a data vector $\hat{v}$ decoded using an information set B. For example, the information set B may include information indicating the order or the arrangement (or, arrangement order) of the plurality of the interleaved information bits, the plurality of the interleaved CRC bits and the plurality of the interleaved frozen bits. The additional message extraction block 724 may extract the vector $\hat{d}'$ including the first decoded data from the decoded data vector $\hat{v}$.

According to an embodiment, the message extraction block 723 may output a second decoded vector $\hat{d}$ using the interleaving pattern or a de-interleaving pattern. Obtaining the interleaving pattern or the de-interleaving pattern at the message extraction block 723 may be elucidated.

The disclosure explains that the CRC encoding block 714 generates the matrix corresponding to the interleaving pattern based on the specific matrix (e.g., a CRC generator matrix), and identifies the interleaving pattern. However, this is merely an example and the function performed by the CRC encoding block 714 may be carried out by other blocks (e.g., the interleaving block 715) of the transmitting node 710.

The operations performed by the blocks of the transmitting node 710 of the disclosure may be referred to as operations performed by the transmitting node 710 or a controller included in the transmitting node 710. For example, it may be understood that the CRC encoding of the CRC encoding block 714 of the transmitting node 710 is performed substantially by the controller of the transmitting node 710.

The operations performed by the blocks of the receiving node 720 of the disclosure may be referred to as operations performed by the receiving node 720 or a controller included in the receiving node 720. For example, it may be understood that the operation of the successive cancellation decoding block 721 of the receiving node 720 is performed substantially by the controller of the receiving node 720.

Figure 7B:
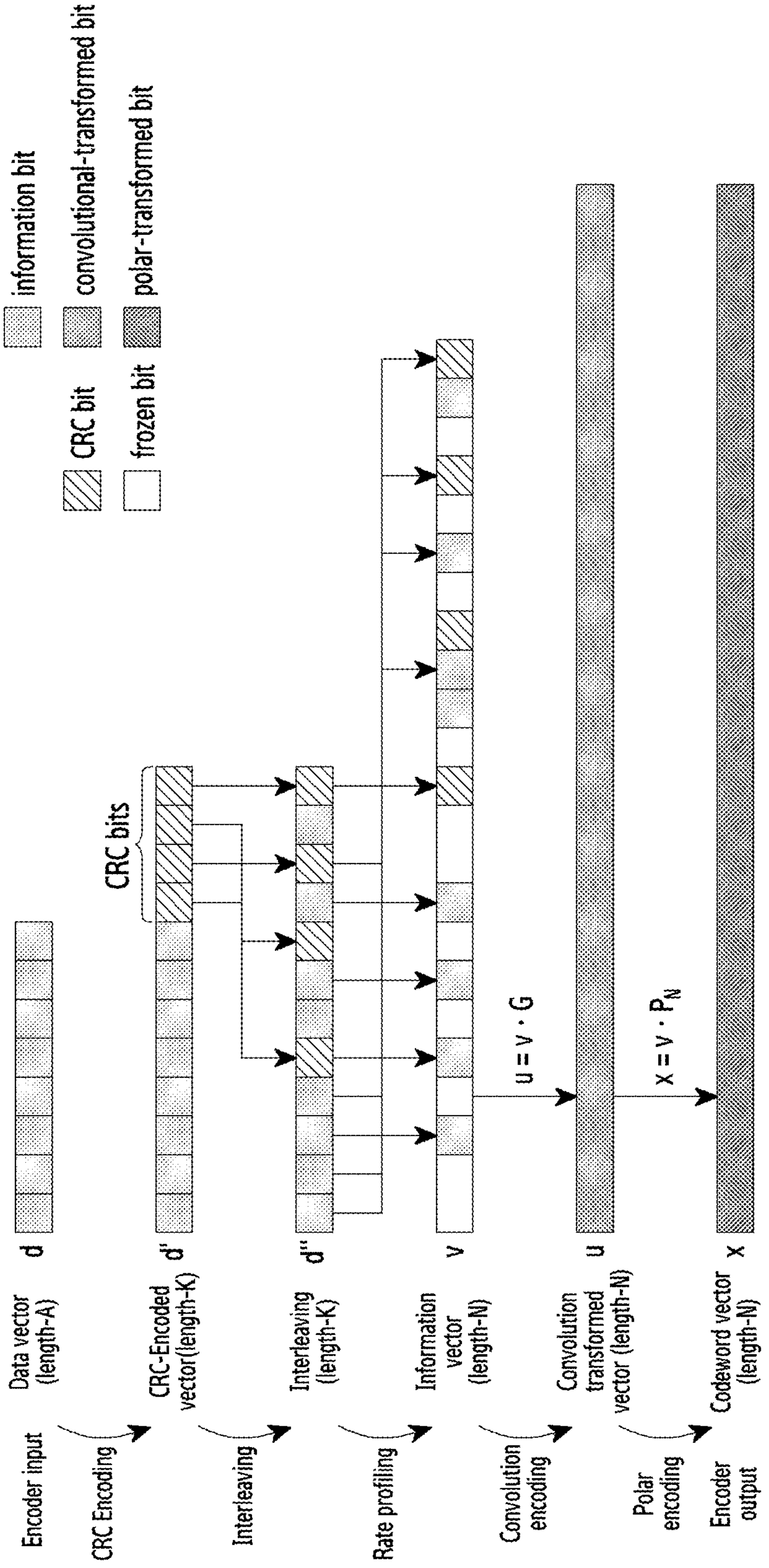
FIG. 7B illustrates encoding based on a PAC coding scheme according to an embodiment of the present disclosure.

FIG. 7B illustrates encoding based on a PAC coding scheme according to an embodiment of the present disclosure.

Referring to FIG. 7B, according to an embodiment, the transmitting node 710 may input the data vector d of the length (or the size) A (e.g., 8 bits) to an encoder of the receiving node 720.

According to an embodiment, the transmitting node 710 may concatenate CRC bits to the data vector d. For example, the CRC bits may be L (e.g., 4 bits) in length (or size), and the CRC encoded vector may have the length (or the size) of K (e.g., 12 bits). For example, the length K of the CRC encoded vector may be A+L.

According to an embodiment, the transmitting node 710 may interleave the CRC encoded vector d'. For example, the receiving node 720 may interleave the bits of the CRC encoded vector based on the identified interleaving pattern.

According to an embodiment, the transmitting node 710 may rate-profile the interleaved vector d". For example, the transmitting node 710 may concatenate a plurality of frozen bits to the interleaved vector. For example, the transmitting node 710 may concatenate the plurality of the frozen bits to the plurality of the information bits and the plurality of the CRC bits. The rate-profiled interleaved vector may be referred to as an information vector v.

According to an embodiment, the length of the information vector v may be a sum of the interleaved vector length (e.g., K) and the number of the concatenated frozen bits.

According to an embodiment, the transmitting node 710 may convolution-encode the information vector v. For example, the transmitting node 710 may transform the information vector v into a convolution vector u using u-=vG corresponding to [Equation 1] of FIG. 4.

According to an embodiment, the transmitting node 710 may polar-encode the convolution vector u. For example, the transmitting node 710 may transform the convolution vector U into a codeword vector N using $X=uP_n$ corresponding to [Equation 2] of FIG. 4.

The CRC encoding, the convolution encoding and the polar encoding described in the disclosure may indicate the transforms in encoding the data vector d including the plurality of the information bits into the codeword vector x. Hence, the CRC encoding may be replaced by CRC concatenation, and the convolution encoding may be replaced by convolution transform, and the polar encoding may be replaced by polar transform.

Figure 8:
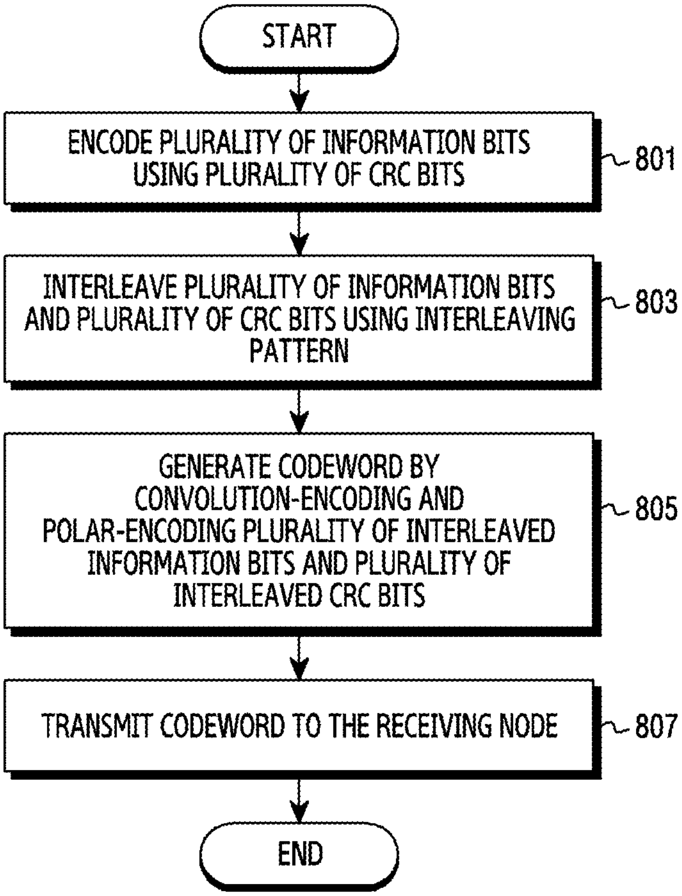
FIG. 8 illustrates a method of a transmitting node for generating and transmitting a codeword to a receiving node according to an embodiment of the present disclosure.

FIG. 8 illustrates a method of a transmitting node for generating and transmitting a codeword to a receiving node according to an embodiment of the present disclosure.

Referring to FIG. 8, according to an embodiment, the transmitting node 710 may encode a plurality of information bits using a plurality of CRC bits in operation 801. For example, the controller of the transmitting node 710 may identify the plurality of the information bits (or data bits) to transmit to the receiving node 720. The controller of the transmitting node 710 may concatenate, insert, or add the CRC bits to the plurality of the information bits. For example, the transmitting node 710 may concatenate the CRC bits to the last bit of the information bits.

According to an embodiment, the CRC bits concatenated to the plurality of the information bits may be preset. For example, the CRC bits concatenated to the plurality of the information bits may be stored in a memory, preconfigured in the transmitting node 710 and the receiving node 720, or generated according to a notified polynomial.

According to an embodiment, the transmitting node 710 may interleave the plurality of the information bits and the plurality of the CRC bits using the interleaving pattern in operation 803. The interleaving pattern may correspond to a matrix generated based on the size of the plurality of the information bits and the size of the plurality of the CRC bits. According to an embodiment, the transmitting node 710 may interleave at least some of the plurality of the information bits and the plurality of the CRC bits using the interleaving pattern. For example, the transmitting node 710 may interleave all of the plurality of the information bits and the plurality of the CRC bits using the interleaving pattern. For example, the transmitting node 710 may interleave only some of the plurality of the information bits and the plurality of the CRC bits using the interleaving pattern.

For example, the transmitting node 710 may interleave only the plurality of the CRC bits among the plurality of the bits using the interleaving pattern. For example, the transmitting node 710 may interleave only the plurality of the information bits among the plurality of the bits using the interleaving pattern. For example, the transmitting node 710 may interleave some information bits and some CRC bits among the plurality of the bits using the interleaving pattern.

For example, the transmitting node 710 may identify a transport block size (TBS) carrying the plurality of the information bits and the plurality of the CRC bits. The transmitting node 710 may identify the size (e.g., A) of the plurality of the information bits and the size (e.g., L) of the plurality of the CRC bits, based on the TBS.

In an embodiment, the transmitting node 710 may identify the specific matrix based on the size (e.g., A) of the plurality of the information bits and the size (e.g., L) of the plurality of the CRC bits. The transmitting node 710 may generate a matrix by permuting the specific matrix (e.g., a CRC generator matrix), and determine the interleaving pattern using the generated matrix. Determining the interleaving pattern by permuting the specific matrix may be elucidated in FIG. 8.

In an embodiment, the specific matrix may be referred to as a matrix for determining the interleaving pattern. The transmitting node 710 may obtain the specific matrix using the CRC generator matrix (e.g., $g=1+r+r^3$), the size (e.g., A) of the plurality of the information bits and the size (e.g., L) of the plurality of the CRC bits.

In [Equation 4], the specific matrix obtained with $g=1+r+r^3$, A=6, and L=3 may be G:

$$G_{CRC} = \begin{bmatrix} 1 & 0 & 0 & 0 & 0 & 0 & 1 & 1 & 0 \\ 0 & 1 & 0 & 0 & 0 & 0 & 0 & 0 & 1 \\ 0 & 0 & 1 & 0 & 0 & 0 & 1 & 0 & 1 \\ 0 & 0 & 0 & 1 & 0 & 0 & 1 & 1 & 1 \\ 0 & 0 & 0 & 0 & 1 & 0 & 1 & 1 & 0 \\ 0 & 0 & 0 & 0 & 0 & 1 & 0 & 1 & 1 \end{bmatrix}. \quad \text{[Equation 4]}$$

According to an embodiment, the plurality of the interleaved information bits and the plurality of the interleaved CRC bits may be referred to as an interleaved vector. For example, the interleaved vector may include the plurality of the interleaved information bits and the plurality of the interleaved CRC bits.

According to an embodiment, the transmitting node 710 may rate-profile the interleaved vector. For example, the rate profile block 711 of the transmitting node 710 may rate-profile the interleaved vector. According to the rate profiling, the interleaved vector may be transformed into a rate profiled vector including information bits comprising information to transmit from the transmitting node 710 and frozen bits without information with a designated rule (or order).

According to an embodiment, the rate-profiled interleaved vector may be referred to as the information vector. For example, the information vector may include a plurality of information bits, a plurality of CRC bits and a plurality of frozen bits.

According to an embodiment, the transmitting node 710 may generate a codeword (or a codeword vector) by convolution-encoding and polar-encoding the plurality of the interleaved information bits and the plurality of the interleaved CRC bits in operation 805.

For example, the convolution transform block 712 of the transmitting node 710 may convolution-encode the information vector. In an embodiment, the convolution-encoded vector may be referred to as a convolution transformed vector. Convolution-transforming the information vector of the disclosure may be understood as encoding based on the convolution transform.

For example, the polar transform block 713 of the transmitting node 710 may polar-encode the convolution-transformed vector. In an embodiment, the polar-encoded vector may be referred to as a codeword. Convolution-transforming the convolution-transformed vector may be understood as encoding the convolution-transformed vector based on the polar transform in the disclosure.

According to an embodiment, the transmitting node 710 may transmit the codeword to the receiving node 720 in operation 807. For example, the codeword may include the plurality of the information bits, the plurality of the CRC bits and the plurality of the frozen bits. The transmitting node 710 may transmit the codeword to the receiving node 720, and the receiving node 720 may decode the received codeword.

The codeword of the disclosure may be referred to as a word generated by the encoding algorithm. As another example, the codework may be referred to as a unit decoded independently.

The term "concatenate" may be replaced by insert, add, or combine in the disclosure.

The term "identify" may be replaced by check, determine, or estimate in the disclosure.

The operations of the transmitting node 710 of the disclosure may be carried out by at least one processor or controller of the transmitting node 710.

The sequence of operations 801 to 807 is an example, and operations 801 to 807 may be performed in parallel or simultaneously.

Figure 9:
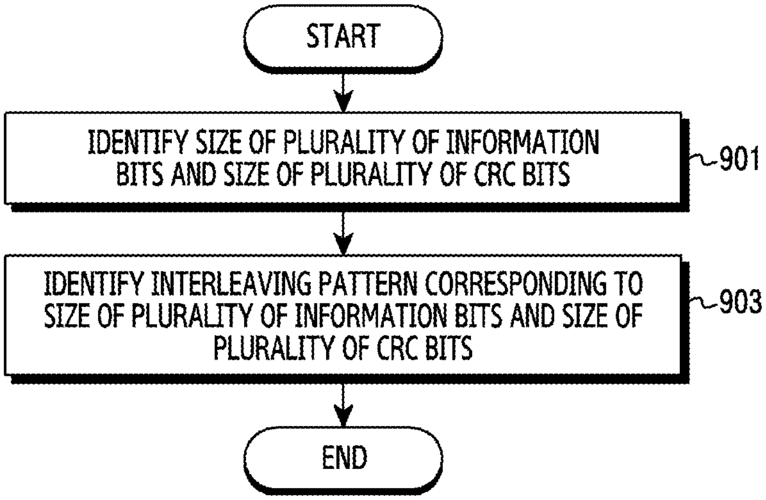
FIG. 9 illustrates a method of a transmitting node for identifying a specific matrix corresponding to a size of a plurality of information bits and a size of a plurality of cyclic redundancy check (CRC) bits according to an embodiment of the present disclosure.

FIG. 9 illustrates a method of a transmitting node for identifying a specific matrix corresponding to a size of a plurality of information bits and a size of a plurality of CRC bits according to an embodiment of the present disclosure.

Referring to FIG. 9, according to an embodiment, the transmitting node 710 may identify a size of a plurality of information bits and a size of a plurality of CRC bits in operation 901. For example, the transmitting node 710 may establish communication connection with the receiving node 720, and identify a TBS transmitting the plurality of the information bits and the plurality of the CRC bits. Based on the TBS, the transmitting node 710 may identify the size (e.g., A) of the plurality of the information bits and the size (e.g., L) of the plurality of the CRC bits.

According to an embodiment, the transmitting node 710 may identify an interleaving pattern corresponding to the size of the plurality of the information bits and the size of the plurality of the CRC bits in operation 903.

For example, the transmitting node 710 may store a lookup table of interleaving patterns. In an embodiment, one interleaving pattern (e.g., $$I_{SIL}^{13,6})$$

may correspond to a first size (e.g., A=13) of the plurality of the information bits and a second size (e.g., L=6) of the plurality of the CRC bits.

TABLE 1

| | L = 6 | L = 11 | L = 16 | . . . |
|---|---|---|---|---|
| A = 13 | $I_{SIL}^{13.6}$ | $I_{SIL}^{13.11}$ | $I_{SIL}^{13.16}$ | . . . |
| A = 14 | $I_{SIL}^{14.6}$ | $I_{SIL}^{14.11}$ | $I_{SIL}^{14.16}$ | . . . |
| A = 15 | $I_{SIL}^{15.6}$ | $I_{SIL}^{15.11}$ | $I_{SIL}^{15.16}$ | . . . |
| A = 16 | $I_{SIL}^{16.6}$ | $I_{SIL}^{16.11}$ | $I_{SIL}^{16.16}$ | . . . |
| . . . | . . . | . . . | . . . | . . . |

According to an embodiment, in case that storing the lookup table of the interleaving patterns, the transmitting node 710 may determine the interleaving pattern using the size (e.g., A) of the plurality of the information bits and the size (e.g., L) of the plurality of the CRC bits. According to an embodiment, the receiving node 720 may store a lookup table of interleaving patterns, and obtain the interleaving pattern from the lookup table. The receiving node 720 may identify the size (e.g., A) of the plurality of the information bits and the size (e.g., L) of the plurality of the CRC bits, determine the interleaving pattern corresponding to the size of the information bits and the size of the CRC bits, and perform decoding using the interleaving pattern. The receiving node 720 may obtain the size of the information bits and the size of the CRC bits based on information transmitted from the transmitting node 710, and the information may be directly indicated by control information (e.g., downlink control information (DCI)) transmitted from the transmitting node and the receiving node, or may be indirectly derived from other information or data.

Operation 901 and operation 903 of FIG. 9 of the disclosure may be performed between operation 801 and operation 803 of FIG. 8. Hence, the embodiment of FIG. 9 may be combined with the embodiment of FIG. 8. However, combining FIG. 9 and FIG. 8 is merely exemplary and the combination order of operations of FIG. 9 and operations of FIG. 8 is not limited.

The sequence of operations 901 to 903 is an example, and operations 901 to 903 may be performed in parallel or simultaneously.

Figure 10:
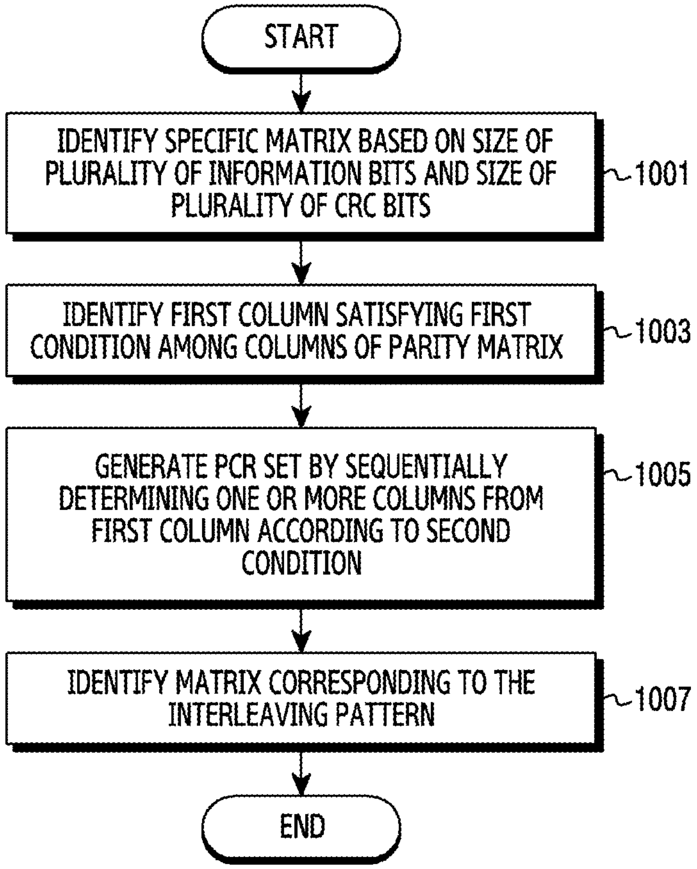
FIG. 10 illustrates a method for identifying a matrix to determine an interleaving pattern using a specific matrix according to an embodiment of the present disclosure.

FIG. 10 illustrates a method for identifying a matrix to determine an interleaving pattern using a specific matrix according to an embodiment of the present disclosure.

Referring to FIG. 10, according to an embodiment, the transmitting node 710 may identify a specific matrix based on a size (e.g., A) of a plurality of information bits and a size (e.g., L) of a plurality of CRC bits in operation 1001. The transmitting node 710 may determine an interleaving pattern by permuting the specific matrix (e.g., a CRC generator matrix). In an embodiment, the specific matrix (e.g., a CRC generator matrix or a parity check matrix) may include an identity matrix and a parity matrix.

According to an embodiment, the specific matrix (e.g., a CRC generator matrix) may be obtained from the parity check matrix.

According to an embodiment, the transmitting node 710 may identify a first column satisfying a first condition among columns of the parity matrix of the specific matrix (e.g., a CRC generator matrix) in operation 1003. For example, the first condition may be a column of the lowest hamming weight of the parity matrix columns, a column of the highest hamming weight of the parity matrix columns, a column of the lowest column index of the parity matrix columns and/or an arbitrary criterion, and may employ any other criterion. For example, the transmitting node 710 identify a column of the lowest hamming weight of the parity matrix columns, and in case that the columns of the parity matrix all have the same hamming weight, may determine a column of the lowest column index as the first column.

In an embodiment, the hamming weight may be referred to as the number of non-zero components in the column. In an embodiment, the columns of the matrix may be indexed from the left, and a low column index may indicate that the column is close to the left among the matrix columns. For example, the column index i of the leftmost column in the matrix columns may be 0. The specific matrix (e.g., a CRC generator matrix) may be a matrix of 6 rows and 9 columns, a 6×6 matrix may be the identity matrix, and a 6×3 matrix may be the parity matrix. The column index i of the first column of the 6×3 parity matrix may be 6, the column index i of the second column of the parity matrix may be 7, and the column index i of the third column of the parity matrix may be 8.

According to an embodiment, the transmitting node 710 may sequentially determine one or more columns from the first column based on a second condition and thus generate a PCR set in operation 1005. For example, the second condition may include at least one of a maximum inner product, a minimum inner product or an arbitrary criterion, and may employ any other criterion.

For example, the second condition may be a column of the maximum inner product (e.g., a maximum inner product) by comparing the first column with other columns of the parity matrix columns. The second condition may be a column of the minimum inner product (e.g., a minimum inner product) by comparing the first column with other columns of the parity matrix columns. Generating the PCR set may be elucidated in FIG. 12.

The second condition may be a column of the maximum inner product and a relatively low column index. For example, in the 6×3 parity matrix, the inner product of the first column and the second column and the inner product of the first column and the third column may be identical. In case that the inner products are substantially the same, the transmitting node 710 may determine the second column having the relatively low column index as the column satisfying the second condition.

Operation 1001 through operation 1005 of the disclosure may be indicated with a pseudocode as shown in [Table 2].

TABLE 2

| |
|---|
| 1) Finding a column index $t_0$ having the least hamming weight in P |
| 2) Setting $\omega'_0 \leftarrow \{\omega_{t0}, t_0 + A\}$, $I_{SIL} \leftarrow \omega'_0$ and $I \leftarrow \{1, 2, \ldots, L\} \setminus t_0$ |
| 3) Column permutation from the second index |
| For $i = 1, \ldots, L-1$ |
| Finding an index $t_i$ of column $p_{t_i}$ from I having the largest inner product value with $p_{t_{i-1}}$ |
| Setting $\omega_i \leftarrow \{\omega_{ti}, t_i + A\}$, $I_{SIL} \leftarrow \{I_{SIL}, \omega'_i \backslash I_{SIL}\}$ and $I \leftarrow I \backslash t_i$ |
| End |
| 4) Output the interleaving pattern $I_{SIL}$, PCR sets $\Omega_t$ ($t = 0, \ldots, L-1$) |

According to an embodiment, the transmitting node 710 may identify the matrix corresponding to the interleaving pattern in operation 1007. For example, the transmitting node 710 may identify the first column satisfying the first condition among the columns of the parity matrix, and identify the matrix with the columns permuted by sequentially determining at least one columns based on the second condition. The matrix generated or identified by permuting the columns of the specific matrix in case that the specific matrix (e.g., a CRC generator matrix) is [Equation 5] may be [Equation 6]:

$$G_{CRC} = \begin{bmatrix} 1 & 0 & 0 & 0 & 0 & 0 & 1 & 1 & 0 \\ 0 & 1 & 0 & 0 & 0 & 0 & 0 & 0 & 1 \\ 0 & 0 & 1 & 0 & 0 & 0 & 1 & 0 & 1 \\ 0 & 0 & 0 & 1 & 0 & 0 & 1 & 1 & 1 \\ 0 & 0 & 0 & 0 & 1 & 0 & 1 & 1 & 0 \\ 0 & 0 & 0 & 0 & 0 & 1 & 0 & 1 & 1 \end{bmatrix} \quad \text{[Equation 5]}$$

$$G'_{CRC} = \begin{bmatrix} 1 & 0 & 0 & 0 & 1 & 0 & 1 & 0 & 0 \\ 0 & 0 & 0 & 0 & 0 & 0 & 0 & 1 & 1 \\ 0 & 1 & 0 & 0 & 1 & 0 & 0 & 0 & 1 \\ 0 & 0 & 1 & 0 & 1 & 0 & 1 & 0 & 1 \\ 0 & 0 & 0 & 1 & 1 & 0 & 1 & 0 & 0 \\ 0 & 0 & 0 & 0 & 0 & 1 & 1 & 0 & 1 \end{bmatrix}. \quad \text{[Equation 6]}$$

According to an embodiment, the transmitting node 710 may generate or identify the interleaving pattern based on the generated or identified matrix. For example, the transmitting node 710 may identify the interleaving pattern {0, 2, 3, 4, 6, 5, 7, 1, 8} through the matrix $G'_{CRC}$ of [Equation 6]. Hereafter, identifying the interleaving pattern {0, 2, 3, 4, 6, 5, 7, 1, 8} through the matrix $G'_{CRC}$ may be elucidated in FIG. 11.

Operation 1001, operation 1003, operation 1005 and operation 1007 of FIG. 10 of the disclosure may be performed between operation 801 and operation 803 of FIG. 8. Hence, the embodiment of FIG. 10 may be combined with the embodiment of FIG. 8. However, combining the operations of FIG. 10 and FIG. 8 is merely exemplary and the disclosure is not limited to the above combination order.

The sequence of operations 1001 to 1007 is an example, and operations 1001 to 1007 may be performed in parallel or simultaneously.

Figure 11:
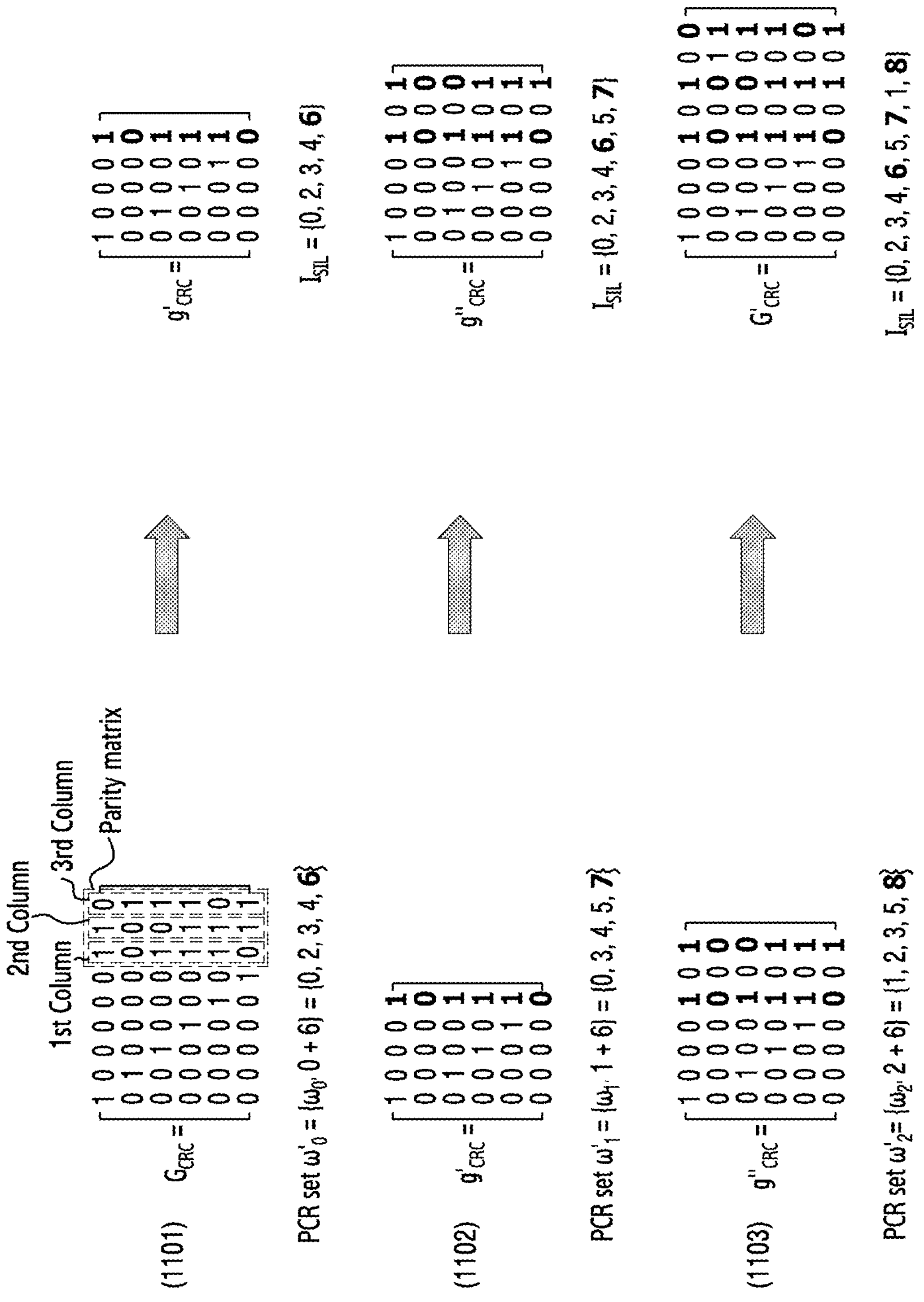
FIG. 11 illustrates a method for identifying an interleaving pattern based on a CRC generator matrix according to an embodiment of the present disclosure.

FIG. 11 illustrates a method for identifying (or determining) an interleaving pattern based on a CRC generator matrix according to an embodiment of the present disclosure.

Referring to FIG. 11, the transmitting node 710 according to an embodiment may identify a first matrix $g'_{CRC}$ based on a specific matrix (e.g., a CRC generator matrix) $G'_{CRC}$ in operation 1101. For example, the transmitting node 710 may identify a column satisfying a first condition in a parity matrix of the specific matrix (e.g., a CRC generator matrix).

In an embodiment, the hamming weight of the first column of the parity matrix columns is 4, the hamming weight of the second column is 4, and the hamming weight of the third column is 4. Since the columns of the parity matrix all have the same hamming weight, the transmitting node 710 may identify the first column of the lowest column index as the column satisfying a first condition.

In an embodiment, since the first column is the $7^{th}$ column from the left column of the specific matrix $G_{CRC}$, the column index i of the first column may be 6. Thus, a first PCR set may be determined as {0, 2, 3, 4, 6}.

In an embodiment, the transmitting node 710 may extract the zeroth, second, third, fourth and sixth columns of the specific matrix $G_{CRC}$ based on the first PCR set {0, 2, 3, 4, 6}, and identify the first matrix $g'_{CRC}$.

According to an embodiment, the transmitting node 710 may determine a first interleaving pattern based on first parity bits (or, first parity component) of the first column of the parity matrix columns. For example, the first parity bits of the first column may be referred to as the first PCR set {0, 2, 3, 4, 6}, and {0, 2, 3, 4, 6} may be determined as the first interleaving pattern. In an embodiment, the first interleaving pattern may indicate arrangement (or, arrangement order) of a plurality of information bits and a plurality of CRC bits.

According to an embodiment, the transmitting node 710 may identify a second matrix $g''_{CRC}$ based on the first matrix $g'_{CRC}$ in operation 1102. For example, the transmitting node 710 may identify the first parity bits of the first column and a second column including the second parity bits satisfying the second condition.

In an embodiment, the inner product of the first parity bits of the first column and the second parity bits of the second column may be 3, and the inner product of the first parity bits of the first column and the third parity bits of the third column may be 2.

In an embodiment, the transmitting node 710 may identify the second column having the relatively high inner product (or the maximum inner product) as the column satisfying the second condition.

In an embodiment, since the second column is the 8th column from the left column of the matrix $G'_{CRC}$, the column index i of the second column may be 7. Hence, a second PCR set may be determined as {0, 3, 4, 5, 7}.

In an embodiment, the transmitting node 710 may determine a second interleaving pattern based on the first PCR set (or the first interleaving pattern) and the second PCR set. For example, the components or the elements included in the first PCR set and the second PCR set may be determined to be include in the second interleaving pattern. For example, the second interleaving pattern may be determined as {0, 2, 3, 4, 5, 6, 7}. The second interleaving pattern may indicate the arrangement (or, arrangement order) of the plurality of the information bits and the plurality of the CRC bits.

In an embodiment, the transmitting node 710 may extract the zeroth, second, third, fourth, fifth, sixth and seventh columns of the specific matrix $G_{CRC}$ based on the second interleaving pattern {0, 2, 3, 4, 6, 5, 7}, and identify a second matrix $g''_{CRC}$.

According to an embodiment, the transmitting node 710 may identify the matrix $g'_{CRC}$ based on the second matrix $g''_{CRC}$ in operation 1103. For example, the transmitting node 710 may identify the third column which is the last column of the parity matrix.

In an embodiment, since the third column is the ninth column from the left column of the $G'_{CRC}$, the column index i of the third column may be 8. Hence, a third PCR set may be determined as {1, 2, 3, 5, 8}.

In an embodiment, the transmitting node 710 may determine a third interleaving pattern based on the second interleaving pattern and the third PCR set. For example, the components or the elements included in the second interleaving pattern and the third PCR set may be determined to be include in the third interleaving pattern. For example, the third interleaving pattern may be determined as {0, 2, 3, 4, 6, 5, 7, 1, 8}. The third interleaving pattern may indicate the arrangement (or, arrangement order) of the plurality of the information bits and the plurality of the CRC bits.

According to an embodiment, the third interleaving pattern may correspond to the interleaving pattern described in operation 803 of FIG. 8. For example, the transmitting node 710 may interleave the plurality of the information bits and the plurality of the CRC bits using the interleaving pattern (e.g., the third interleaving pattern) in operation 803 of FIG. 8.

According to an embodiment, the transmitting node 710 may interleave at least some of the plurality of the information bits and the plurality of the CRC bits using the interleaving pattern. For example, the transmitting node 710 may interleave all of the plurality of the information bits and the plurality of the CRC bits using the interleaving pattern. For example, the transmitting node 710 may interleave only some of the plurality of the information bits and the plurality of the CRC bits using the interleaving pattern.

For example, the transmitting node 710 may interleave only the plurality of the CRC bits among the plurality of the bits using the interleaving pattern. For example, the transmitting node 710 may interleave only the plurality of the information bits among the plurality of the bits using the interleaving pattern. For example, the transmitting node 710 may interleave some of the plurality of the information bits and some of the plurality of the CRC bits using the interleaving pattern.

FIG. 12 illustrates changing (or modifying) PCR sets according to an embodiment of the present disclosure.

Referring to FIG. 12, according to an embodiment, the transmitting node 710 may identify or generate a CRC-encoded vector by concatenating a plurality of CRC bits to a plurality of information bits. For example, the plurality of the information bits may correspond to six bits, and the plurality of the CRC bits may correspond to three bits.

According to an embodiment, the transmitting node 710 may identify original PCR sets from the CRC-encoded vector. For example, a first original PCR set may be {0, 2, 3, 5}, a second original PCR set may be {1, 3, 5, 6} and a third original PCR set may be {0, 4, 5, 6}. In an embodiment, the transmitting node 710 may identify or determine an interleaving pattern. For example, the interleaving pattern may be determined as {0, 2, 3, 5, 7, 1, 6, 8, 4, 9}.

The original PCR set of FIG. 12 of the disclosure may be used merely to, but not limited to, distinguish from other PCR set.

Identifying the original PCR sets in the disclosure may be performed in substantially the same manner as identifying the first PCR set of FIG. 11. Identifying the interleaving pattern in the disclosure may be performed in substantially the same manner as identifying the third interleaving pattern of FIG. 11.

According to an embodiment, the transmitting node 710 may interleave the CRC-encoded vector. For example, the transmitting node 710 may interleave the plurality of the bits included in the CRC-encoded vector.

According to an embodiment, the original PCR sets may include information on at least one parity bit include in columns corresponding to the plurality of the CRC bits and information on an arrangement order of columns corresponding to the plurality of the CRC bits. For example, the first original PCR set may be {0, 2, 3, 5, 7}, and {0, 2, 3, 5} may include the parity bit information (e.g., the first, third, fourth and sixth column components each are 1) of the eighth column. {7} may indicate that the column corresponding to the first CRC bit of the CRC bits is arranged in the seventh column in the CRC-encoded vector. That is, {7} which is the component of the first original PCR set may indicate the column index i of the column corresponding to the first CRC bit. The CRC-encoded vector may indicate a vector before the bits are interleaved.

For example, the second original PCR set may be {1, 3, 5, 6, 8}, and {1, 3, 5, 6} may include the parity bit information (e.g., the second, fourth, sixth column and seventh column components each are 1) of the ninth column. {8} may indicate that the column corresponding to the second CRC bit of the CRC bits is arranged in the ninth column in the CRC-encoded vector. That is, {8} which is the component of the second original PCR set may indicate the column index i of the column corresponding to the second CRC bit.

For example, the third original PCR set may be {0, 4, 5, 6, 9}, and {0, 4, 5, 6} may include the parity bit information (e.g., the first, fifth, sixth and seventh column components each are 1) of the 10th column. {9} may indicate that the column corresponding to the third CRC bit of the CRC bits is arranged in the 10th column in the CRC-encoded vector. That is, {9} which is the component of the original PCR set may indicate the column index i of the column corresponding to the third CRC bit.

According to an embodiment, the transmitting node 710 may identify a modified PCR set based on the original PCR sets. In an embodiment, the modified PCR set may be referred to as a PCR set of the interleaved vector.

For example, the CRC bits in the CRC-encoded vector may be arranged in the eighth column, and the eighth 10th columns. Hence, the CRC bits may have the column index of i=7, 8, 9 in order.

In an embodiment, as the CRC-encoded vector is rearranged by the interleaving pattern of {0, 2, 3, 5, 7, 1, 6, 8, 4, 9}, the column index i of the bits included in the interleaved vector may be represented as {0, 2, 3, 5, 7, 1, 6, 8, 4, 9} from the left.

In an embodiment, the transmitting node 710 may represent a newly modified column index i' from the left of the interleaved vector, and the newly modified column index i' may be {0,1, 2, 3, 4, 5, 6, 7, 8, 9} from the left.

In an embodiment, the transmitting node 710 may determine a first modified PCR set corresponding to the first original PCR set {0, 2, 3, 5} as {0, 1, 2, 3, 4}. In an embodiment, the transmitting node 710 may determine a second modified PCR set corresponding to the second original PCR set {1, 3, 5, 6} as {2, 3, 5, 6, 7}. The transmitting node 710 may determine a third modified PCR set corresponding to the third original PCR set {0, 4, 5, 6} as {0, 3, 6, 8, 9}.

According to an embodiment, the modified PCR sets may indicate information on arrangement order of the plurality of the information bits and arrangement of the plurality of the CRC bits. For example, {0, 1, 2, 3, 4} of the first modified PCR set {0, 1, 2, 3, 4, 5} may indicate that the information bits of the column index i of {0, 2, 3, 5} in the CRC-encoded vector have the modified column index i' of {0, 1, 2, 3} in the interleaved vector. For example, {4} of the first modified PCR set {0, 1, 2, 3, 4} may indicate that the modified column index i' of the first order CRC bit (e.g., the first CRC bit) is 4.

For example, {2, 3, 5, 6} of the second modified PCR set {2, 3, 5, 6, 7} may indicate that the information bits of the column index i of {1, 3, 5, 6} in the CRC-encoded vector have the modified column index i' of {2, 3, 5, 6} in the interleaved vector. In an embodiment, the information bit having the column index 1 in the CRC-encoded vector may have the modified column index of 5 in the interleaved vector. The information bit having the column index of 3 in the CRC-encoded vector may have the modified column index of 2 in the interleaved vector. For example, {7} of the second modified PCR set may indicate that the modified column index i' of the second CRC bit (e.g., the second CRC bit) is 7.

For example, {0, 3, 6, 8} of the third modified PCR set {0, 3, 6, 8, 9} may indicate that the information bits of the column index i of {0, 4, 5, 6} in the CRC-encoded vector have the modified column index i' of {0, 3, 6, 8} in the interleaved vector. For example, {8} of the third modified PCR set may indicate that the modified column index i' of the third order CRC bit (e.g., the third CRC bit) is 8.

According to an embodiment, the transmitting node 710 may rate-profile the interleaved vector. For example, the transmitting node 710 may concatenate the plurality of the frozen bits to the interleaved vector.

According to an embodiment, the transmitting node 710 may identify the PCR set based on the modified PCR sets. The third PCR set may be referred as an PCR set of the information vector.

For example, the transmitting node 710 may identify a final column index i' newly modified from the left of the information vector. The final column index i' may be {0, 1, 2, 3, . . . , 31} from the left.

In an embodiment, the transmitting node 710 may identify that the information bits having the modified column index i' of {0, 1, 2, 3} in the interleaved vector have the final column index i' of {8, 11, 13, 17} in the information vector. Hence, the transmitting node 710 may determine the first PCR set as {8, 11, 13, 17, 20}.

According to an embodiment, the PCR set may indicate arrangement of the plurality of the information bits and arrangement of the plurality of the CRC bits rate-profiled. For example, {8, 11, 13, 17} of the first PCR set {8, 11, 13, 17, 20} may indicate the final column index i' in the information vector of the information bits having the modified column index i' of {0, 1, 2, 3} in the interleaved vector. For example, {20} of the first PCR set may indicate that the final column index i' in the information vector of the CRC bit having the modified column index i' of {4} in the interleaved vector.

For example, {13, 17, 21, 25} of the second PCR set {13, 17, 21, 25, 27} may indicate the final column index in the information vector of the information bits having the modified index of {2, 3, 5, 6} in the interleaved vector. For example, {27} of the second PCR set may indicate that the final column index in the information vector of the CRC bit having the modified column index of {7} in the interleaved vector.

For example, {8, 17, 25, 30} of the third PCR set {8, 17, 25, 30, 31} may indicate the final column index in the information vector of the information bits having the modified index of {0, 3, 6, 8} in the interleaved vector. For example, {31} of the third PCR set may indicate the final column index in the information vector of the CRC bit having the modified column index of {9} in the interleaved vector.

Figure 13:
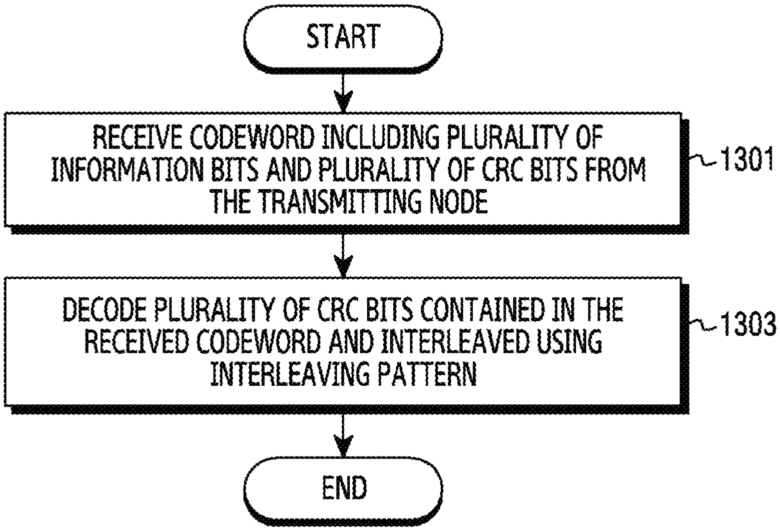
FIG. 13 illustrates a method for decoding at a receiving node according to an embodiment of the present disclosure.

FIG. 13 illustrates a method for decoding at a receiving node according to an embodiment of the present disclosure.

Referring to FIG. 13, according to an embodiment, the receiving node 720 may receive a codeword including a plurality of information bits and a plurality of CRC bits from the transmitting node 710 in operation 1301.

According to an embodiment, interleaving the plurality of the information bits and the plurality of the CRC bits using an interleaving pattern may be performed substantially at the transmitting node 710.

According to an embodiment, the receiving node 720 may receive interleaving pattern information corresponding to a TBS from the transmitting node 710. For example, to decode the received codeword, the receiving node 720 may need to identify the interleaving pattern, and may receive the interleaving pattern information from the transmitting node 710. As another example, the transmitting node 710 and the receiving node 720 may be configured with the interleaving pattern corresponding to the TBS.

According to an embodiment, the receiving node 720 may decode the plurality of the CRC bits included in the received codeword and interleaved using the interleaving pattern in operation 1303.

For example, the receiving node 720 may decode the bits included in the codeword received using the search tree scheme. The receiving node 720 may extract information bits from the decoded bits based on the interleaving pattern and PCR set information.

According to an embodiment, the PCR set information may be received from the transmitting node 710. For example, the transmitting node 710 may transmit the PCR set information in or before transmitting the codeword to the receiving node 720. As another example, the PCR set information may be preconfigured for the transmitting node 710 and the receiving node 720.

The sequence of operations 1301 to 1303 is an example, and operations 1301 to 1303 may be performed in parallel or simultaneously.

Figure 14:
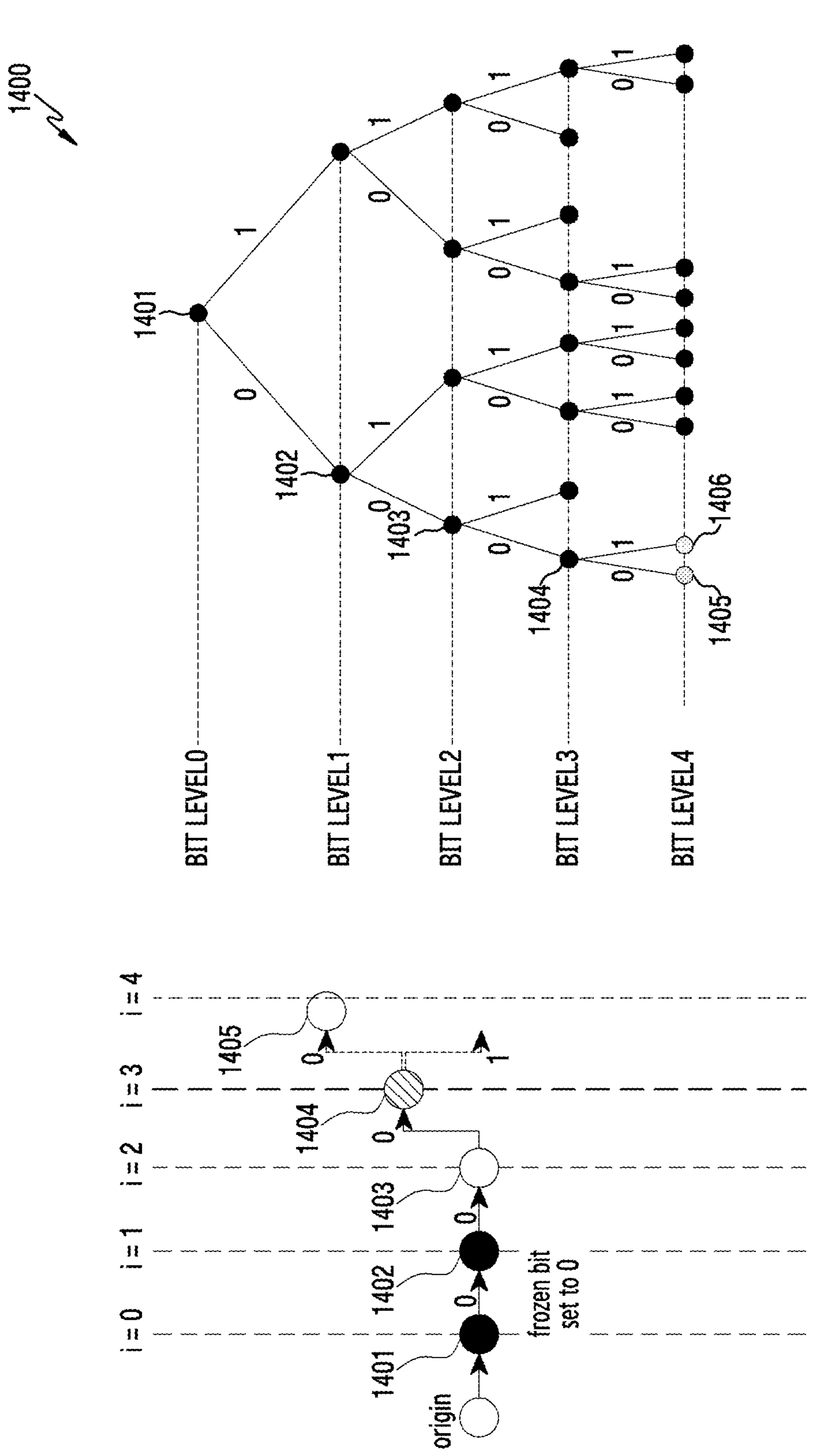
FIG. 14 illustrates a method for decoding at a receiving node according to an embodiment of the present disclosure.

FIG. 14 illustrates a diagram illustrating a method for decoding at a receiving node according to an embodiment of the present disclosure.

Referring to FIG. 14, according to an embodiment, the receiving node 720 may receive a codeword including an arbitrary number (e.g., 5) of bits, and decode the codeword. For example, the codeword may include a first bit and a second bit corresponding to frozen bits, a third bit and a fifth bit corresponding to information bits, and a fourth bit corresponding to a CRC bit.

According to an embodiment, the receiving node 720 may generate or identify a search tree 1400 to decode the codeword including at least five bits.

According to an embodiment, the search tree 1400 may include a plurality of nodes, and the plurality of the nodes may have different bit levels. For example, a first node 1401 may have the bit level 0, a second node 1402 may have the bit level 1, and a third node 1403 may have the bit level 2. A fourth node 1404 may have the bit level 3, and a fifth node 1405 may have the bit level 4.

According to an embodiment, paths between the nodes may correspond to the bits. For example, a path between the first node 1401 and the second node 1402 may correspond to the first bit. A path between the second node 1402 and the third node 1403 may correspond to the second bit. For example, a path between the third node 1403 and the fourth node 1404 may correspond to the third bit. A path between the fourth node 1404 and the fifth node 1405 may correspond to the fourth bit.

According to an embodiment, the receiving node 720 may identify that the first bit and the second bit are the frozen bits, and determine or estimate that values corresponding to the first bit and the second bit are "0."

According to an embodiment, the receiving node 720 may identify that the third bit is the information bit, and decode the information bit. For example, the receiving node 720 may estimate a reliability value of the third bit, and compare the reliability value and a first threshold value. In case that the reliability value is greater than the first threshold value, the receiving node 720 may determine a bit value of the third bit.

In the example shown in FIG. 14, the receiving node 720 may estimate the third bit as "0," and compare a first reliability value of the estimated "0" with the first threshold value. In case that the first reliability value is greater than the first threshold value, the receiving node 720 may estimate or determine the third bit value as "0."

Unlike the example shown in FIG. 14, in case that the first reliability value is smaller than the first threshold value, the receiving node 720 may estimate the third bit as "1." The receiving node 720 may compare a second reliability value of the estimated value "1" with the first threshold value. In case that the second reliability value is greater than the first threshold value, the receiving node 720 may estimate or determine the third bit value as "1."

According to an embodiment, the receiving node 720 may identify that the fourth bit is the CRC bit, and decode the fourth bit which is the CRC bit. In an embodiment, the receiving node 720 may perform the CRC at the fourth node 1404. For example, the receiving node 720 may decode the fourth bit and then perform the CRC using the first bit value, the second bit value, the third bit value and the fourth bit value. For example, the receiving node 720 may perform the CRC in response to decoding the CRC bit (e.g., the fourth bit). For example, the receiving node 720 may perform the CRC in response to identifying the CRC bit (e.g., the fourth bit) value.

According to an embodiment, in case that successfully decoding the CRC (e.g., early CRC), the receiving node 720 may decode bits arranged after the CRC bit (e.g., the fourth bit) among the bits included in the received codeword. For example, the decoding result of the fourth bit may be determined as "0," the decoded bits are "0000" and accordingly the CRC result may be successful. Since the early CRC is successful, the receiving node 720 may rely on the decoded value "0000" and decode the fifth bit.

As a result, the receiving node 720 may minimize or reduce the search space by performing the CRC early (or the early CRC). For example, the decoding result of the fifth bit which is the information bit and a fifth order bit may be estimated or determined as "0," and the decoding result of the sixth bit which is the information bit and a sixth order bit may be estimated or determined as "1." The decoding result of the seventh order bit which is the CRC bit and a seventh order bit may be determined as "0." In the example, the receiving node 720 may perform the early CRC, and the CRC result of "0000010" may be failure.

In an embodiment, the receiving node 720 may return to and decode the fifth bit or the sixth bit. That is, since the CRC results of the first bit through the fourth bit are successful, the receiving node 720 may not need to return to the first bit through the fourth bit. As a result, the receiving node 720 may minimize or reduce the search space.

However, the above example merely eases the explanation and the disclosure is not limited to the above example. For example, even if the first CRC based on "0000" is successful but the second CRC based on "0000010" fails, the receiving node 720 may return to the first bit through the fourth bit. For example, if satisfying a designated condition, the receiving node 720 may return to the first bit through the fourth bit. The designated condition may indicate that the receiving node 720 returns to the fifth bit and the sixth bit for the decoding but obtains no decoding result satisfying a specific reliability value.

In an embodiment, the CRC failure indicates that the path including the fourth bit is wrong in the search tree. For example, since the decoding result of the fourth bit may be determined as "1" and the decoded bits are "0001," the CRC result may be the failure.

According to an embodiment, in response to the CRC failure, the receiving node 720 may reattempt to decode the bits arranged before the CRC bit (e.g., the fourth bit). For example, in case that the CRC result is the failure, the receiving node 720 may return to the first component of the PCR set received from the transmitting node 710 and reattempt the decoding. That is, in case that the CRC result is the failure, the receiving node 720 may return to the first node to reattempt the decoding.

The bits arranged before the CRC bit may be referred to as bits decoded before the CRC bit among the plurality of the bits in the disclosure. The bits arranged after or following the CRC bit may be referred to as bits decoded after the CRC bit among the plurality of the bits in the disclosure.

According to an embodiment, in case that the CRC result is the success, there may be no need to return or move backward to a node (e.g., the third node 1403) having the lower bit level than the fourth node 1404 in next decoding. Alternatively, in case that the CRC result is successful, there may be no need to re-decode the bits arranged before the CRC bit (e.g., the fourth bit) in next decoding. However, even with the CRC success, the receiving node 720 may return or move backward to the node having the lower bit level than the fourth node 1404.

As a result, as the CRC bits are interleaved, the receiving node 720 may reduce the search space, and minimize or reduce the latency.

For example, since the CRC bits are not interleaved, it may be assumed that the decoded bits from the first node 1401 to an n-th node are all information bits and a bit decoded at an (n+1)-th node is the CRC bit. In the example, the decoded bits from the first node 1401 to the n-th node may be "0001 . . . 1," and the receiving node 720 performs the CRC based on "0001 . . . 1" but the CRC result may be "failure." That is, in case that the CRC bits are not interleaved, the receiving node 720 may decode from the first node 1401 to the n-th node and then perform the CRC, and search all from the first node 1401 to the n-th node in case that the CRC fails. Hence, in case that the CRC bits are not interleaved, relatively considerable time may be consumed in the decoding.

By contrast, in case that the CRC bits are interleaved in the interleaving pattern according to an embodiment, the receiving node 720 may perform the early CRC in response to decoding the CRC bit (e.g., the fourth bit), and in case that the CRC fails, may re-decode the first bit through the fourth bit, without decoding at the node of the lower bit level than the fourth node 1404. That is, by early performing the CRC, the receiving node 720 may reduce or minimize the search space. That is, by early identifying decoding error through the early CRC, the receiving node 720 may reduce or minimize unnecessary decoding.

Thus, according to an embodiment, the receiving node 720 may reduce the search space and the latency by interleaving the CRC bits in the interleaving pattern. For example, as the CRC bits are interleaved, the receiving node 720 may perform the early CRC. As the early CRC is conducted, the receiving node 720 may reduce the search space and the latency.

According to an embodiment, the receiving node 720 may decode the fifth node. For example, the receiving node 720 may identify a third reliability of the fifth bit which is the information bit, and compare the third reliability and the second threshold value. In case that the third reliability value is greater than the second threshold value, the receiving node 720 may determine the fifth bit value. In an embodiment, the second threshold value may be higher than the first threshold value.

In the disclosure, the CRC success may indicate that the bits decoded by the receiving node 720 substantially correspond to or match the bits encoded by the transmitting node 710. In the disclosure, the CRC failure may indicate that the bits decoded by the receiving node 720 substantially do not correspond to or match at least in part the bits encoded by the transmitting node 710. According to an embodiment, in case that the CRC fails, the receiving node 720 may re-decode the received bits in various manners, and perform correction.

In the disclosure, in case that the CRC (or the early CRC) fails, the receiving node 720 may perform the decoding using various method, which shall be described hereafter.

According to an embodiment, in case that the CRC fails, the receiving node 720 may identify the node of the highest bit level among the nodes included in the search path, and return to a node of a lower bit level than the highest bit level identified.

For example, the receiving node 720 may determine the fourth bit which is the CRC bit as "1" and determine the search path to the sixth node 1406. In response to the CRC failure, the receiving node 720 may return to the fourth node 1404. In the example, returning from the sixth node 1406 to the fourth node 1404 may be referred to as "backward." In the example, the receiving node 720 may perform the decoding again starting from the fourth node 1404.

For example, the receiving node 720 may determine the fourth bit which is the CRC bit as "1," and determine the search path to the sixth node 1406. In response to the CRC failure, the receiving node 720 may return to the first node 1401. In the example, the receiving node 720 may perform the decoding again starting from the first node 1401. In the example, returning to the first node 1401 may substantially indicate that the receiving node 720 returns to the first component of its received PCR sets. In other words, the first component of the PCR set received at the receiving node 720 from the transmitting node 710 may substantially correspond to the first bit of the received codeword. Hence, returning to the first node 1401 may have substantially the same meaning as returning to the first component of the PCR sets.

According to an embodiment, in case that the CRC fails, the receiving node 720 may identify the node of the highest bit level among the nodes included in the search path, and change the search path to a node of substantially the same bit level as the highest bit level identified.

For example, the receiving node 720 may determine the fourth bit which is the CRC bit as "1." The search path may be determined to the sixth node 1406. In response to the CRC failure, the receiving node 720 may change the search path to the fifth node 1405 having substantially the same bit level as the sixth node 1604. The receiving node 720 may decode back from the fifth node 1405. Changing the search path between the nodes having substantially the same bit level may be substantially referred to as "lateral (or looking another option)."

According to an embodiment, the receiving node 720 may flip the bit value of the lowest branch metric in the search tree 1400. For example, in case that the CRC fails and the bit value of the lowest branch metric is estimated as "0" in the search tree 1400, the receiving node 720 may change the bit value to "1." For example, in case that the lowest bit value is estimated as "1," the receiving node 720 may change the bit value to "0."

FIG. 14 of the disclosure describes correcting the bit value based on the node of the search tree, but this is merely exemplary. Correcting the bit value may be described based on the bit.

For example, in case that the CRC fails, the receiving node 720 may re-decode the bit lower than the CRC bit. For example, if performing the CRC on the fourth bit which is the CRC bit but failing in the CRC, the receiving node 720 may return to the third bit lower than the fourth bit. In the example, returning to the third bit may be substantially referred to as "backward." For example, in case that performing the CRC on the fourth bit which is the CRC bit but failing in the CRC, the receiving node 720 may return to the first bit. The bit lower than the CRC bit in the disclosure may indicate the bit arranged before the CRC bit in the codeword substantially received.

According to an embodiment of the disclosure, a method performed by a transmitting node in a wireless communication system may include encoding a plurality of information bits using a plurality of CRC bits, interleaving the plurality of the information bits and the plurality of the CRC bits using an interleaving pattern, generating a codeword by convolution-encoding and polar-encoding the plurality of the interleaved information bits and the plurality of the interleaved CRC bits, and transmitting the codeword to a receiving node. The interleaving pattern may correspond to a matrix generated based on a size of the plurality of the information bits and a size the plurality of the CRC bits.

According to an embodiment, the matrix may be generated by permuting columns of a specific matrix including an identity matrix and a parity matrix. Permuting the columns may include identifying a first column satisfying a first condition among columns of the parity matrix, and generating a PCR set by sequentially determining one or more columns starting from the first column based on a second condition.

According to an embodiment, the first condition may include at least one of a minimum hamming weight, a maximum hamming weight, the lowest column index, or an arbitrary criterion. The second condition may include at least one of a maximum inner product, a minimum inner product, or an arbitrary criterion.

According to an embodiment, the method may further include determining a first interleaving pattern based on first parity components in the first column among the columns of the parity matrix, identifying a second column including second parity components which satisfy the second condition with the first parity components of the first column, and determining a second interleaving pattern based on the second parity components of the second column. The first interleaving pattern may indicate a first arrangement of the plurality of the information bits and the plurality of the CRC bits. The second interleaving pattern may include the first interleaving pattern.

According to an embodiment, the plurality of the information bits and the plurality of the CRC bits may be interleaved based on a second arrangement order indicated by the second interleaving pattern.

According to an embodiment, the method may further include identifying columns corresponding to the plurality of the CRC bits among the plurality of the columns of the matrix, identifying first PCR sets including information on parity components s of the columns corresponding to the plurality of the CRC bits and information on an arrangement order of the columns corresponding to the plurality of the CRC bits, identifying second PCR sets including information of the arrangement of the plurality of the information bits and the arrangement of the plurality of the CRC bits interleaved based on the first PCR sets, and identifying third PCR sets including information of the arrangement of the plurality of the information bits and the arrangement of the plurality of the CRC bits rate-profiled based on the second PCR sets.

According to an embodiment of the disclosure, a transmitting node in a wireless communication system may include a transceiver and a controller. The controller may be configured to encode a plurality of information bits using a plurality of CRC bits, interleave the plurality of the information bits and the plurality of the CRC bits using an interleaving pattern, generate a codeword by convolution-encoding and polar-encoding the plurality of the interleaved information bits and the plurality of the interleaved CRC bits, and transmit the codeword to a receiving node. The interleaving pattern may correspond to a matrix generated based on a size of the plurality of the information bits and a size the plurality of the CRC bits, According to an embodiment, the matrix may be generated by permuting columns of a specific matrix including an identity matrix and a parity matrix. The columns may be permuted by identifying a first column satisfying a first condition among columns of the parity matrix, and generating a PCR set by sequentially determining one or more columns starting from the first column based on a second condition.

According to an embodiment, the first condition may include at least one of a minimum hamming weight, a maximum hamming weight, the lowest column index, or an arbitrary criterion. The second condition may include at least one of a maximum inner product, a minimum inner product, or an arbitrary criterion.

According to an embodiment, the controller may be configured to determine (or, identify) a first interleaving pattern based on first parity components in the first column among the columns of the parity matrix, and the first interleaving pattern may indicate a first arrangement of the plurality of the information bits and the plurality of the CRC bits. The controller may be configured to identify a second column including second parity components which satisfy the second condition with the first parity components of the first column, and determine a second interleaving pattern based on the second parity components of the second column. The plurality of the information bits and the plurality of the CRC bits may be interleaved based on a second arrangement order indicated by the second interleaving pattern. The second interleaving pattern may include the first interleaving pattern.

According to an embodiment, the controller may be configured to identify columns corresponding to the plurality of the CRC bits among the plurality of the columns of the matrix, and identify first PCR sets including parity bit information on the columns corresponding to the plurality of the CRC bits and arrangement information on the columns corresponding to the plurality of the CRC bits. The controller may be configured to identify second PCR sets including information on the arrangement of the plurality of the information bits and the arrangement of the plurality of the CRC bits interleaved based on the first PCR sets, and identify third PCR sets including information on the arrangement of the plurality of the information bits and the arrangement of the plurality of the CRC bits rate-profiled based on the second PCR sets.

According to an embodiment of the disclosure, a method performed by a receiving node in a wireless communication system may include receiving a codeword including a plurality of information bits and a plurality of CRC bits from a transmitting node, and decoding the plurality of the CRC bits included in the received codeword and interleaved using the interleaving pattern. The plurality of the information bits and the plurality of the CRC bits may be interleaved using an interleaving pattern. The interleaving pattern may correspond to a matrix generated based on a size of the plurality of the information bits and a size the plurality of the CRC bits.

According to an embodiment, the codeword may be generated by convolution-encoding and polar-encoding the plurality of the interleaved information bits and the plurality of the interleaved CRC bits.

According to an embodiment, the plurality of the CRC bits may be decoded using a search tree scheme. A tree in the search tree scheme may include a plurality of nodes.

According to an embodiment, decoding the plurality of the CRC bits may include decoding a first CRC bit among the plurality of the CRC bits, in case that a CRC result is successful in response to decoding the first CRC bit, decoding bits arranged after the first CRC bit among the bits included in the received codeword, and in case that the CRC result of the first CRC bit is failure, decoding bits arranged before the first CRC bit among the bits included in the received codeword.

According to an embodiment, the method may further include decoding the plurality of the information bits. Decoding the plurality of the information bits may include comparing a first reliability of a first information bit with a first threshold value, and in case that the first reliability is higher than the first threshold value, comparing a second reliability of a second information bit with a second threshold value. The second threshold value may be higher than the first threshold value.

According to an embodiment of the disclosure, a receiving node in a wireless communication system my include a transceiver and a controller. The controller may be configured to receive a codeword including a plurality of information bits and a plurality of CRC bits from a transmitting node, and decode the plurality of the CRC bits included in the received codeword and interleaved using the interleaving pattern. The plurality of the information bits and the plurality of the CRC bits may be interleaved using an interleaving pattern. The interleaving pattern may correspond to a matrix generated based on a size of the plurality of the information bits and a size the plurality of the CRC bits.

According to an embodiment, the codeword may be generated by convolution-encoding and polar-encoding the plurality of the interleaved information bits and the plurality of the interleaved CRC bits.

According to an embodiment, the plurality of the CRC bits may be decoded using a search tree scheme. A tree in the search tree scheme may include a plurality of nodes.

According to an embodiment, the controller may be configured to decode a first CRC bit among the plurality of the CRC bits, in case that a CRC result is successful in response to decoding the first CRC bit, decode bits arranged after the first CRC bit among the bits included in the received codeword, and in case that the CRC result of the first CRC bit is failure, decode bits arranged before the first CRC bit among the bits included in the received codeword.

According to an embodiment, the controller may be configured to decode the plurality of the information bits, compare a first reliability of a first information bit with a first threshold value, and in case that the first reliability is higher than the first threshold value, compare a second reliability of a second information bit with a second threshold value. The second threshold value may be higher than the first threshold value.

Meanwhile, the present specification and the drawings disclose the preferred of the disclosure, and specific terms are used, which are merely used in a general sense to easily explain the technical details of the disclosure and to help the understanding of the disclosure, not to limit the scope of the disclosure. It will be apparent to those skilled in the art that other modifications based on the technical idea of the disclosure may be carried out in addition to the embodiments disclosed herein.

What is claimed is:

1. A method performed by a transmitting node, the method comprising:

encoding information bits by concatenating cyclic redundancy check (CRC) bits to a last information bit of the information bits;

identifying a matrix mapped with a size of the information bits and a size of the CRC bits, wherein the matrix includes a first sub matrix corresponding to an identity matrix and a second sub matrix;

identifying, for each column of the second sub matrix, first row indices in which 1 is located;

generating an interleaving pattern by sequentially adding, for each column of the second sub matrix, second row indices that are not previously added among the first row indices;

interleaving, based on the interleaving pattern, the information bits and the CRC bits;

generating a codeword by performing a convolution-encoding and a polar-encoding on the interleaved information bits and the interleaved CRC bits; and transmitting the codeword to a receiving node.

2. The method of claim 1, wherein the interleaving pattern corresponds to a matrix that is generated by permuting columns of the matrix including the first sub matrix corresponding to the identity matrix and the second sub matrix corresponding to a parity matrix.

3. The method of claim 2, wherein permuting the columns comprises:

identifying a first column satisfying a first condition among columns of the parity matrix, and generating a parity check relationship (PCR) set by sequentially determining, based on a second condition, one or more columns starting from the first column.

4. The method of claim 3, wherein the first condition comprises at least one of a minimum hamming weight, a maximum hamming weight, a lowest column index, or an arbitrary criterion, and wherein the second condition comprises at least one of a maximum inner product, a minimum inner product, or an arbitrary criterion.

5. The method of claim 3, further comprising:

identifying a first interleaving pattern based on first parity components in the first column among the columns of the parity matrix, the first interleaving pattern indicating a first arrangement order of the information bits and the CRC bits;

identifying a second column comprising second parity components that satisfy the second condition with the first parity components of the first column; and determining a second interleaving pattern based on the second parity components of the second column, and wherein the interleaving pattern corresponds to the first interleaving pattern, and wherein the information bits and the CRC bits are interleaved based on a second arrangement order indicated by the second interleaving pattern.

6. The method of claim 1, further comprising:

identifying columns corresponding to the CRC bits among columns of the matrix;

identifying first parity check relationship (PCR) sets comprising information on parity components included in the columns corresponding to the CRC bits and information on an arrangement order of the columns corresponding to the CRC bits;

identifying, based on the first PCR sets, second PCR sets comprising information on an arrangement order of the information bits and information on an arrangement order of the interleaved CRC bits; and identifying, based on the second PCR sets, third PCR sets comprising information on an arrangement order of the information bits and information on an arrangement order of rate-profiled CRC bits.

7. The method of claim 1, further comprising:

receiving downlink control information including information indicating the size of the information bits and the size of the CRC bits; and in case that a table including an interleaving pattern per the size of the information bits and the size of the CRC bits is stored, identifying the interleaving pattern mapped with the size of the information bits and the size of the CRC bits using the table.

8. The method of claim 1, further comprising:

identifying a transport block size (TBS) including the information bits and the CRC bits, wherein the size of the information bits and the size of the CRC bits are determined based on the TBS.

9. A transmitting node comprising:

at least one transceiver;

at least one processor communicatively coupled to the at least one transceiver; and at least one memory, communicatively coupled to the at least one processor, storing instructions executable by the at least one processor individually or in any combination to cause the transmitting node to:

encode information bits by concatenating cyclic redundancy check (CRC) bits to a last information bit of the information bits, identify a matrix mapped with a size of the information bits and a size of the CRC bits, wherein the matrix includes a first sub matrix corresponding to an identity matrix and a second sub matrix, identify, for each column of the second sub matrix, first row indices in which 1 is located, generate an interleaving pattern by sequentially adding, for each column of the second sub matrix, second row indices that are not previously added among the first row indices, interleave, based on the interleaving pattern, the information bits and the CRC bits, generate a codeword by performing a convolution-encoding and a polar-encoding on the interleaved information bits and the interleaved CRC bits, and transmit the codeword to a receiving node.

10. The transmitting node of claim 9, wherein the interleaving pattern corresponds to a matrix that is generated by permuting columns of the matrix including the first sub matrix corresponding to the identity matrix and the second sub matrix corresponding to a parity matrix.

11. The transmitting node of claim 10, wherein the instructions further cause the transmitting node to:

identify a first column satisfying a first condition among columns of the parity matrix, and generate a parity check relationship (PCR) set by sequentially determining, based on a second condition, one or more columns starting from the first column.

12. The transmitting node of claim 11, wherein the first condition comprises at least one of a minimum hamming weight, a maximum hamming weight, a lowest column index, or an arbitrary criterion, and wherein the second condition comprises at least one of a maximum inner product, a minimum inner product, or an arbitrary criterion.

13. The transmitting node of claim 11, wherein the instructions further cause the transmitting node to:

identify a first interleaving pattern based on first parity components in the first column among the columns of the parity matrix, wherein the first interleaving pattern indicates a first arrangement order of the information bits and the CRC bits, identify a second column comprising second parity components that satisfy the second condition with the first parity components of the first column, and determine a second interleaving pattern based on the second parity components of the second column, and wherein the interleaving pattern corresponds to the first interleaving pattern, wherein the information bits and the CRC bits are interleaved based on a second arrangement order indicated by the second interleaving pattern.

14. The transmitting node of claim 9, wherein the instructions further cause the transmitting node to:

identify columns corresponding to the CRC bits among columns of the matrix, identify first parity check relationship (PCR) sets comprising information on parity components included in the columns corresponding to the CRC bits and information on an arrangement order of the columns corresponding to the CRC bits, identify, based on the first PCR sets, second PCR sets comprising information on an arrangement order of the information bits and information on an arrangement order of the interleaved CRC bits, and identify, based on the second PCR sets, third PCR sets comprising information on an arrangement order of the information bits and information on an arrangement order of the rate-profiled CRC bits.

15. The transmitting node of claim 14, wherein the instructions further cause the transmitting node to:

receive downlink control information including information indicating the size of the information bits and the size of the CRC bits, and in case that a table including an interleaving pattern per the size of the information bits and the size of the CRC bits is stored, identify the interleaving pattern mapped with the size of the information bits and the size of the CRC bits using the table.

16. The transmitting node of claim 14, wherein the instructions further cause the transmitting node to:

identify a transport block size (TBS) including the information bits and the CRC bits, wherein the size of the information bits and the size of the CRC bits are determined based on the TBS.

* * * * *